United States Patent [19]

Bendixen et al.

[11] Patent Number: 4,890,315
[45] Date of Patent: Dec. 26, 1989

[54] CELLULAR REMOTE STATION WITH MULTIPLE COUPLED UNITS

[75] Inventors: Arne B. Bendixen; William A. Bowen; Michael W. Evans, all of Lynchburg, Va.; John J. Hurley, Hudson, Ohio; Samuel A. Leslie, Forest, Va.

[73] Assignee: Orion Industries, Inc., Solon, Ohio

[21] Appl. No.: 291,343

[22] Filed: Dec. 29, 1988

Related U.S. Application Data

[63] Continuation of Ser. No. 28,249, Mar. 20, 1987, abandoned.

[51] Int. Cl.⁴ ............................................. H04G 7/04
[52] U.S. Cl. ........................................ 379/59; 155/33; 379/58; 379/63
[58] Field of Search ........................ 379/63, 58, 59, 61, 379/60; 455/33, 54, 56, 58, 43, 34, 12

[56] References Cited

U.S. PATENT DOCUMENTS

| | | | |
|---|---|---|---|
| 4,590,331 | 5/1986 | Nunemaker et al. | 379/201 |
| 4,658,096 | 4/1987 | West, Jr. et al. | |
| 4,669,109 | 5/1987 | Le Cheviller et al. | 379/143 |
| 4,677,654 | 6/1987 | Weiner et al. | |
| 4,718,080 | 1/1988 | Serrano et al. | 379/59 |
| 4,737,975 | 4/1988 | Shafer | 379/58 |
| 4,745,632 | 5/1988 | Duffy | 379/58 |
| 4,748,655 | 5/1988 | Thrower et al. | 379/60 |
| 4,748,685 | 5/1988 | Rozanski, Jr. | 455/218 |
| 4,752,949 | 6/1988 | Steinbeck et al. | 379/61 |

FOREIGN PATENT DOCUMENTS

| | | | |
|---|---|---|---|
| 2950387 | 6/1981 | Fed. Rep. of Germany | 379/61 |
| 2538978 | 7/1984 | France | 379/144 |
| 0033331 | 2/1983 | Japan | 379/61 |
| 0181867 | 10/1984 | Japan | 379/61 |
| 0148927 | 7/1986 | Japan | 379/61 |

OTHER PUBLICATIONS

CyberTel-Cox Proposal to the Federal Communications Commission.
Canadian Marconi Company, advertising brochure entitled "Marconi Canada RACE Dial Access HF Radio System for Telephone Service into Remote Areas".
Printed publication entitled "RACE-an Improved High Frequency Radio Telephone System for Remote Areas" by Chow and McLarnon and Derbyshire, on or about 9/14–17/81.
Technical Manual of the RACE System bearing at date of Nov. 22, 1984.
Motorola Document 1S-SP134682, ©date 1973, IMTS Subscriber Unit.
GNT Automatic Document, Description and Specification GNTA Payphone Type AY4 (NMT) for Connection to a Mobile Radiostation in Accordance with the Specifications for the Nordic Mobile Telephone Systems (NMT), 2/25/82.
Glenayre Electronics Manual, GL2020 Mobile Telephone Operating Instructions.
"Where the Cables Can't Go", published in a magazine entitled Cellular Business, Oct., 1984.

*Primary Examiner*—Robert Lev
*Attorney, Agent, or Firm*—Dressler, Goldsmith, Shore, Sutker & Milnamow, Ltd.

[57] ABSTRACT

A system for coupling a plurality of telephones or local units to a remote land line telephone system includes a line interface associated with each of the telephones or local units. Each of the line interfaces is in turn coupled to an audio switch matrix. Outputs and inputs to and from the audio switch matrix are coupled to a 4 to 2 wire hybrid, a tone interface hybrid and a computer based control unit. The control unit includes a programmed microcomputer with interface circuits enabling it to communicate with and to control the line interfaces and the audio switch matrix. The computer also includes interface circuits enabling it to communicate with and control a radio transceiver. The radio transceiver is in radio frequency communication with a corresponding radio transceiver remotely located and coupled to the remote land line telephone system. Communications with the remote land line telephone system can be initiated by any of the local units. Additionally, communications from the remote land line telephone system can be received at each of the local units, only if at least one unique identifier is received by the transceiver of the local unit.

23 Claims, 34 Drawing Sheets

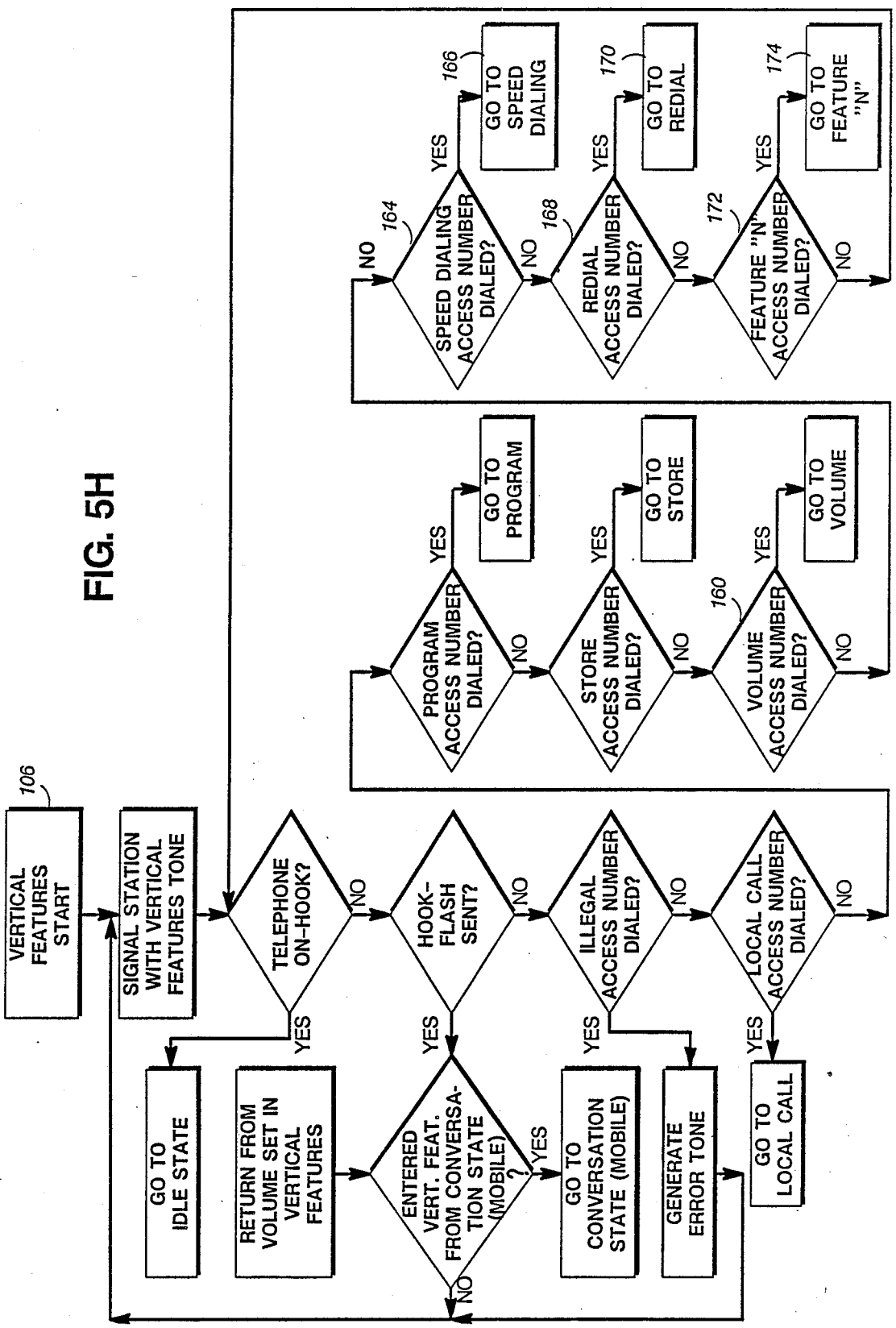

CELLULAR REMOTE STATION WITH MULTIPLE COUPLED UNITS

This application is a continuation of application Ser. No. 028,249, filed Mar. 20, 1987, now abandoned.

FIELD OF THE INVENTION

The invention pertains to radio communication systems. More particularly, the invention pertains to remote stations usable with cellular telephone systems. Each of the remote stations is couplable to other communication units.

BACKGROUND OF THE INVENTION

Cellular telephone systems are today operational in a large number of cities in the United States and in several foreign countries. These systems were originally designed to provide improved vehicle based, mobile, telephone service. In this type of installation, a transceiver is mounted in a vehicle along with a control head. Telephone calls may be received at the control head in the vehicle or initiated via the control head in the vehicle. The calls are transmitted via radio link to and from the vehicle and to and from an adjacent or nearby cellular base station. Cellular mobile transmission takes place in an 800–900 MHz band. The cellular base station is in turn coupled to a land based telephone system.

As an alternate to mounting a cellular transceiver in a vehicle, it has been found useful and beneficial to use cellular transceivers not only in vehicles but also at remote sites where land line telephone systems cannot be cost effectively or conveniently installed or maintained. For example, cellular transceivers have found use on oil drilling platforms, and in remote geographical areas such as farms, ranches or vacation resorts. Cellular transceivers have also been successfully used on board ships.

In this latter type of installation, it is desirable to be able to use standard telephone equipment in conjunction with the cellular mobile transceiver unit. Such equipment has a two wire loop start interface as opposed to the multi-line digital interfaces of the control heads commonly used in cellular mobile installations. Several types of products have been developed to meet these needs. For example, one interface permits an ordinary telephone to be connected to a cellular mobile transceiver. This interface provides for connection of only one telephone line to the cellular mobile transceiver. This interface includes a wired logic control unit as opposed to a programmable processor.

Another product, is an interface which provides for coupling a computer or other electronic equipment, which could include a telephone, to a cellular mobile transceiver. Such a transceiver could be mounted in a vehicle or could alternately be located at a fixed remote site.

None of the known available systems make full use of the potential of cellular telephone communications to provide telephone service or communication at sites which can then be coupled via the cellular transceiver to a remote land line telephone system. Rural wireless telephone systems are known which operate in conjunction with earlier MTS and IMTS wireless telephone technology. These systems provide service for multiple units locally connected to a transceiver. The transceiver communicates via radio link to a remote land line telephone system. These systems transmit calling digit information to the remote land line system as each digit is received from a locally connected unit. Known rural telephone systems do not provide the improved performance characteristics that are available through the use of cellular telephone systems.

Thus, there continues to be a need for cellular based remote stations which can provide a variety of telephone or data communication services to communication units which are coupled to the cellular transceiver. These units are linked to remote land line telephone systems only via the cellular radio transmission system.

SUMMARY OF THE INVENTION

A remote station is provided for use in a radio telephone network. The remote station is connectable to one or more communication units. The units can but need not be physically located near the remote station. In a particular embodiment, the remote station is part of a cellular network and includes a cellular transceiver.

The transceiver can detect and respond to one or more incoming predetermined identification or telephone numbers which it receives via the cellular transmission network. The transceiver can transmit the detected predetermined identification number or an indicia thereof to other circuitry in the remote station.

Coupled to the transceiver is a control unit which can store each detected incoming identification or telephone number received from the transceiver. A switching system coupled to the control unit can respond to the incoming identification or telephone number and couple an appropriate communication unit to the transceiver.

In one embodiment of the invention, a plurality of communication units, each associated with a different identification or telephone number can be coupled to the switching system. Upon detection of a valid incoming number received from the transceiver unit, the control unit, via the switching system, can establish a signaling path between the transceiver and the corresponding unit. The signaling path can generate ringing signals which can be detected by the respective communication unit. When the communication unit responds appropriately, a communication link can be established between that unit and the transceiver. The communication link extends via radio transmission to the remote land line system. Once a unit has been placed in communication with the transceiver, any other unit attempting to use the system to initiate communication via the transceiver will receive a busy signal from the control unit indicating that the system has already started servicing another communication unit and is not currently available.

In another embodiment of the invention, the units can be other data communication units such as computers, keyboards or sensors.

The control system can include a programmable processor. Random access memory can be utilized to temporarily store transaction or communication related information. Read only memory can be utilized to store a permanently encoded control program.

The switching system can be implemented in part by the use of cross-point switches which provide for switchable audio communication paths between the various communication units and the transceiver. Such switches also make possible simultaneous communication between communication units. Such unit-to-unit communication does not require use of the transceiver.

The control unit can also include dial pulse and/or DTMF generating and detecting modules. A communication path may be initiated by any one of the communication units, via the transceiver, to the remote land line telephone system initiated by signals generated in the communication unit.

In yet another embodiment of the invention, the remote station can be utilized to emulate a trunk level interface. In this embodiment, the remote station can be coupled to a PBX. The station also forwards a portion of the incoming identification number to the PBX for further processing.

Additional remote stations can be coupled to the PBX to provide additional trunk line inputs. Each of the control units is coupled to a separate transceiver. Each of the control units is assigned a priority and does not receive an incoming identification or telephone number for processing until all of the higher priority units are busy servicing an incoming or an outgoing communication to or from the local PBX unit.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
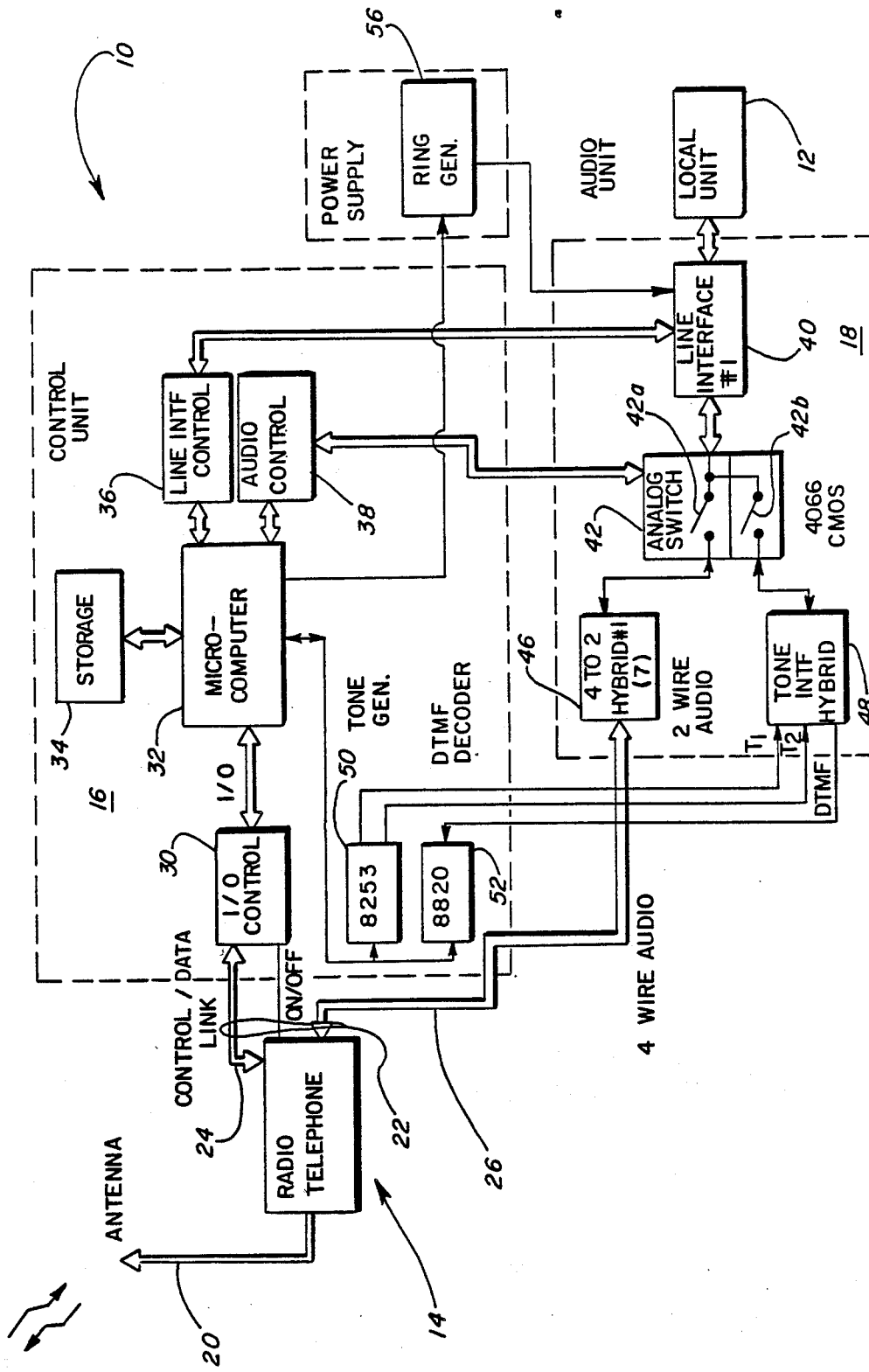
FIG. 1 is an overall hardware block diagram of a cellular remote station coupled to a single communication unit.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1 is an overall hardware block diagram of a remote station 10 in accordance with the present invention. The remote station 10 is suited for installation at areas or regions whereat it is inconvenient, not cost effective or otherwise undesirable to run land line telephone systems. The remote station 10 is usable in a radio telephone system with a base station spaced physically therefrom which is in turn coupled to a remote land line telephone system. The base station communicates with the remote station 10 only via a radio link.

Coupled to the remote station 10 is a local unit 12. The local unit 12 can be any type of communication apparatus that is used in telephony. For example, the local unit 12 could be a telephone station set with a loop start, two wire telephone interface. Alternately, the local unit could be a non-standard telephone or any other type of information processing apparatus which could advantageously be coupled into the remote land line telephone system. It will be understood that the nature and type of the local unit 12 are not limitations of the present invention.

Further, it will be understood that the phrase "local unit" as used herein is not intended to connote physical proximity between the unit 12 and the remote station 10. The local unit 12 could be physically close to the station 10. On the other hand, local unit 12 could be a substantial distance from the remote station 10. In such an instance, the remote unit 12 could be electrically coupled to the remote station 10 by wires, or any type of electro-magnetic transmission link. The local unit 12 could also be any form of wireless or radio telephone.

What the phrase "local unit" as used herein is intended to connote is a communication unit of some type that can receive information from the remote land line telephone system or send information to that system via remote station 10.

The base system 10 includes a radio telephone transceiver 14, a control unit 16 and an audio unit 18. An antenna 20 is coupled to an RF part of the transceiver 14.

The transceiver 14 can be any type which is compatible with the radio telephone system within which the remote station 10 is to function. More particularly, the radio telephone 14 can be a cellular mobile transceiver such as a General Electric cellular mobile transceiver, model number CF1000. It will be understood that the particular type of radio telephone system in which the remote system 10 is to function is not a limitation of the present invention.

A transceiver control port 22 provides a bidirectional control path 24 and a bidirectional audio path 26 to and from the transceiver 14 and the control unit 16.

The control unit includes an input/output control circuits 30 which provide bidirectional communication between the transceiver 14 and a programmable processor 32. Coupled to the programmable processor 32 is a storage unit 34. The storage unit 34 includes random access as well as read only memory. The programmable processor 32 is also coupled to bidirectional line interface control circuits 36 and audio control circuits 38. The line interface control circuits 36 are in turn coupled to a line interface unit 40 in the audio unit 18. The audio control circuits 38 are in turn coupled to an analog switch 42. The switch 42 can be an analog switch such as a 4066 CMOS switch with at least two independently closable contacts, 42A and 42B.

The audio unit 18 also includes a four wire to two wire hybrid circuit 46 and a tone interface hybrid circuit 48. The four wire to two wire hybrid circuit 46 is in turn coupled via audio transmission path 26 to the transceiver 14. The tone interface hybrid circuit 48 is coupled to a programmable tone generator 50 and a DTMF tone decoder 52 both of which are in the control unit 16.

The programmable tone generator 50, under control of the programmable processor 32, generates busy and dial tone signals which can be transmitted via the tone interface hybrid circuit 48, analog switch 42 and the line interface 40 to the local unit 12.

Similarly, line interface 40 can transmit DTMF tone signals generated by the local unit 12, via the analog switch 42 and the tone interface hybrid 48, to the tone decoder 52. Line interface 40 can also detect dial pulse signals generated by the local unit 12 as well as hook switch or hook flash signals. In addition, under control of the programmable processor 32 and the audio control circuitry 38, the analog switch 42 provides a bidirectional audio communication path between the local unit 12 and the transceiver 14. Line interface 40 provides interfacing between the elements of the control unit 16 and the local unit 12. Ringing signal generator 56 can be activated by processor 32 to provide a ringing signal to the unit 12.

It will be understood that the local unit 12 could be an ordinary telephone station set or in fact could be any other type of electronic device, such as a computer system, which is intended to generate DTMF tones or dial pulse signals and intended to be used in connection with telephone communications. Further, it would be understood that the local unit 12 may, but need not be, closely situated to the remote station 10. The local unit 12 could be coupled to the line interface 40 by means of cabling. Alternately, the local unit 12 could in fact be linked to the line interface 40 itself by means of a radio link. It would be understood that the reference "local unit" as used in connection with this disclosure refers to an electronic or electromechanical unit which in some fashion is capable of communicating with a remote land line telephone system via the remote station 10.

In operation, an incoming communication arrives at transceiver 14 via the antenna 20 from a base station associated with the remote land line telephone system. Provided that the incoming identification number or unit number received by transceiver 14 corresponds to the identification or telephone number to which transceiver 14 is keyed, transceiver 14 via control port 22 signals the I/O control circuitry 30 and hence the programmable processor 32 that an incoming communication has arrived to be directed to local unit 12. Such keying is conventionally accomplished today when cellular mobile transceivers are installed by encoding the predetermined identification number in ROM or in EEPROM.

Upon receipt of a signal from the transceiver 14, via the control circuitry 30 indicating that the predetermined identification number has been received, programmable processor 32 actuates ringing signal generator 56 which via line interface 40 applies a ringing to local unit 12. In the case of a conventional telephone, the telephone would then ring. Ringing generators of the type of ringing generator 56 are conventional and well known in the art.

When local unit 12 is activated, for example in the case of a telephone station unit if it goes off hook, processor 32 actuates contact 42a of analog switch 42 providing a bidirectional audio path between local unit 12 and the transceiver 14.

Remote station 10, in addition to providing ringing current and an audio communication path for local unit 12, also can provide other standard services associated with telephone communication. For example, when local unit 12 goes off hook and it is desired to place an outgoing call, DTMF signals generated within the local unit 12 are transmitted via contact 42b and interface hybrid 48 to tone decoder 52. Tone decoder 52 in turn provides digital representations of the incoming analog DTMF tones to the programmable processor 32. When unit 12 generates dial pulse signals, instead of DTMF tones, these pulses are transmitted via the line interface 40 and interface control circuits 36 to processor 32.

When the complete identification or telephone number has been entered through the local unit 12, programmable processor 32 transfers a digital representation of that number, via I/O circuitry 30 to transceiver 14 for transmission to the remote base station and remote land line telephone system. Upon completion of transmission of the identification number via the transceiver 14, analog switch contact 42a is closed establishing an audio communication path between local unit 12 and transceiver 14.

In addition, the remote station 10 can provide a variety of standard vertical services such as speed dialing, amplitude or volume control, and last number redial. These are initiated at local unit 12 by generating DTMF tones or by actuating the hook switch as is conventional with PBX type systems.

Figure 2:
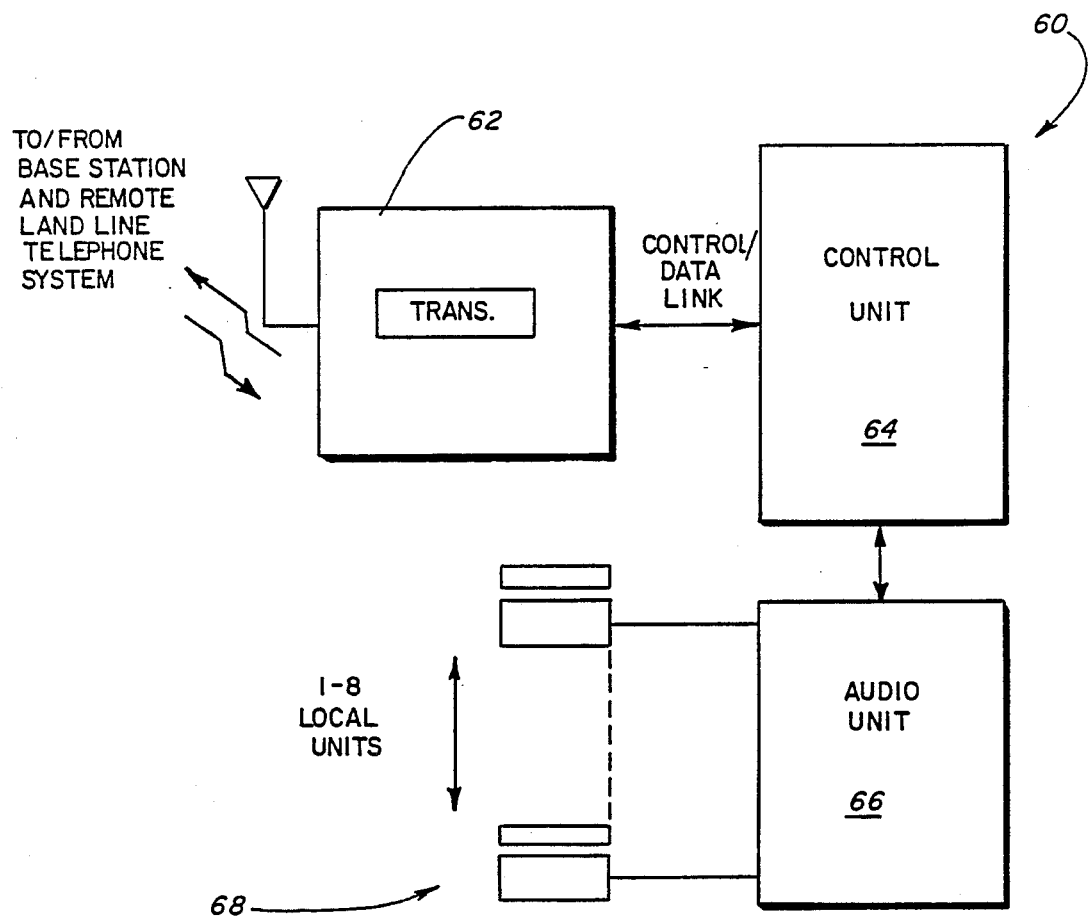
FIG. 2 is an overall hardware block diagram of a cellular remote station coupled to a plurality of communication units.

FIG. 2 illustrates another remote station 60. Remote station 60 includes a radio telephone transceiver 62, a control unit 64 and an audio unit 66. Coupled to the audio unit 66 is a plurality of local units, for example 1-8. The plurality of local units 68 can include standard telephone station equipment or other electronic equipment such as computer systems and the like.

In contradistinction to the remote system 10, the remote system 60 can provide service to any of the members of the plurality 68. Further, any of the members of the plurality 68 can initiate communications via transceiver 62 with the remote base station and the remote land line telephone system. Hence, remote station 62 is ideally suited to use where it is impractical or undesirable to run land lines but where it is desirable to provide multi-unit communications. Examples include remote resorts, oil drilling platforms or rural areas. In addition, remote station 60 would be usable on board ship to provide multi-station communication or telephone service to individuals on board quite apart from standard radio ship board communications equipment.

Figure 3:
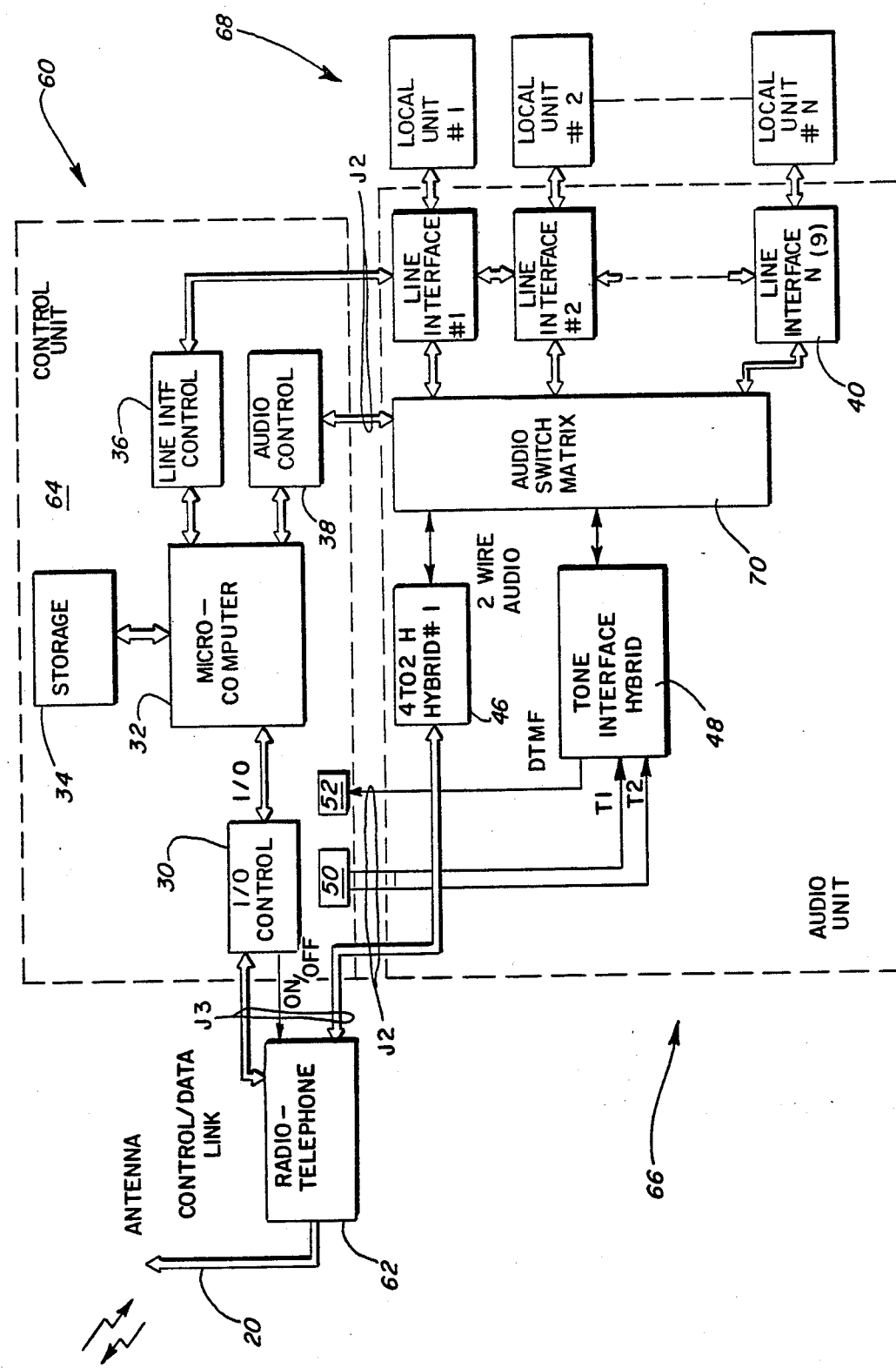
FIG. 3 is a more detailed hardware block diagram of the remote station of FIG. 2.

FIG. 3 is a more detailed block diagram of the remote station 60. Numerous of the elements of the remote station 60 correspond to the elements of the remote station 10. In those instances corresponding identification numerals have been used.

Transceiver 62 is distinguishable from transceiver 14 in that transceiver 62 has the ability to detect at least as many different identification numbers as there are local units. For example, if the plurality 68 includes the equivalent of eight identification numbers transceiver 62 would include the equivalent of eight different members in its list of predetermined identification numbers. Further, in contradistinction to the transceiver 14, transceiver 62 is capable of transmitting from the communication port J3, a predetermined and detected identification number which has been received via the antenna 20. The I/O control circuitry 30 receives the number from the port J3 and transfers it to the programmable processor 32. The programmable processor 32 can in turn store the received identification number for subsequent use.

Further, the audio unit 66 includes a plurality of line interfaces 40, one associated with a corresponding member of the plurality of local units 68. To effectuate switching of the members of the plurality 68 to the radio telephone or transceiver 62, a cross-point switch 70 such as a Mitel MT8804 can be used. The audio hybrid 46 and the tone hybrid 48, both of which are coupled to inputs to the switch matrix 70, can in turn be coupled to any of the members of the plurality of local units 68.

The remote station 60 can provide all of the usual types of telephone communication support services to the local units 68. For example, each of the members of the plurality 68 can be individually called from the remote land line telephone system via the remote base station. Further, each of the members of the plurality 68 can initiate outgoing communications via the transceiver 62 to the remote land line telephone system. Alternately, the members of the plurality 68 can initiate local calls among the members of the plurality simply by entering the corresponding identification number such as by the use of a standard push button pad or rotary dial in the event the local units are telephones. Further, as was the case with the remote station 10, remote station 60 can provide a predetermined variety or array of vertical services such as speed dialing, volume control or last number redial.

Figure 4:
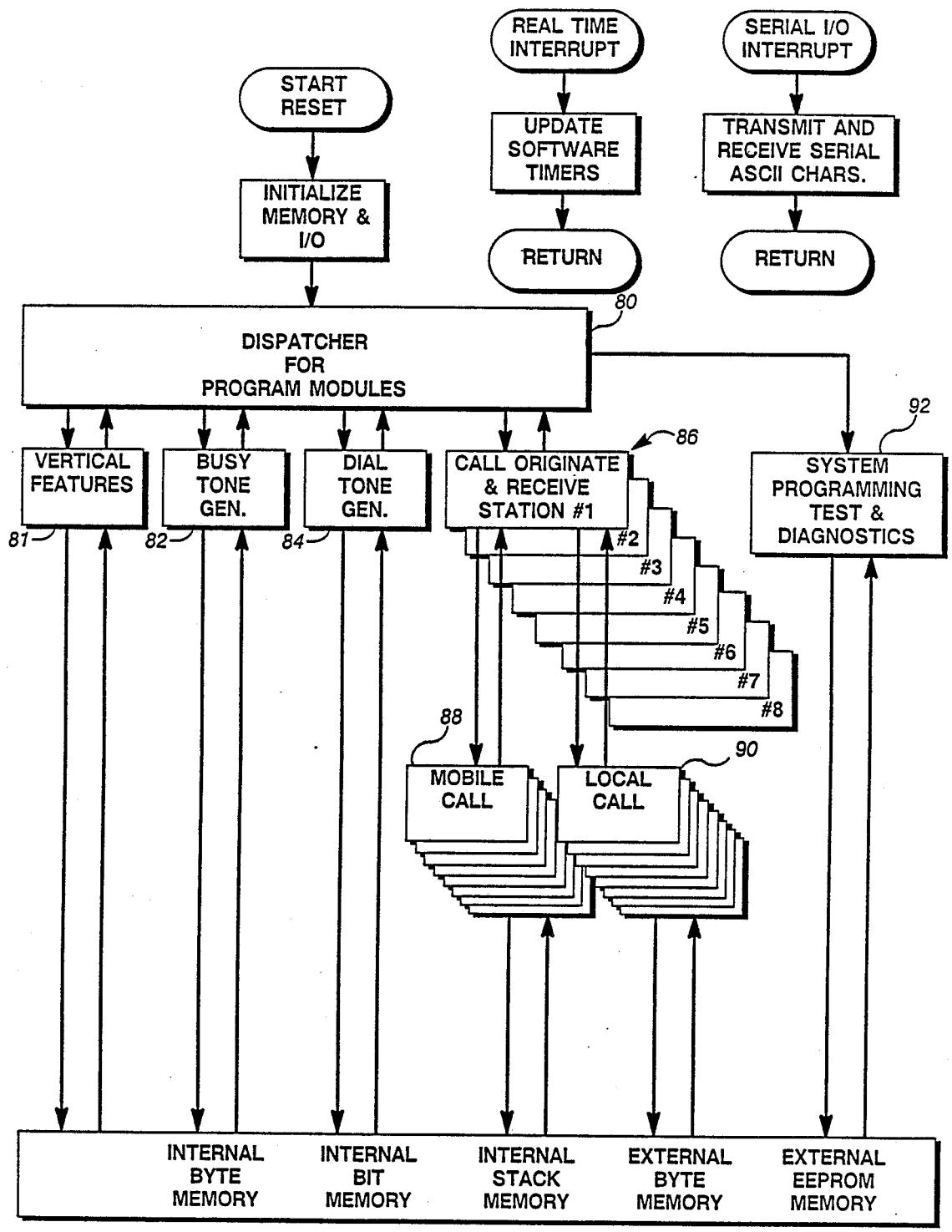
FIG. 4 is a diagram of the organization of the software modules of the remote stations of FIGS. 1 and 2.

The diagram of FIG. 4 illustrates the over-all organization of the software utilized in connection with the remote station 60. System software, as is conventional, is stored in read only memory in the storage unit 34. These programs include a dispatcher module 80. The dispatcher or scheduling module 80 initiates functioning of vertical features module 81, busy tone generator module 82, dial tone generator module 84. A plurality of control block 86, one associated with each member of the plurality of local units 68 provides call origination and call receive services. Each of the call originate and receive modules has associated with it a mobile call subroutine 88 used in connection with calls going through the transceiver 62. An intercom call subroutine 90 is used for communications local to the remote station 60 which do not get transmitted through the transceiver 62. It will be understood that the term "mobile" as used herein refers to a transceiver such as the transceiver 62.

Further, the diagram of FIG. 4 illustrates which portions of the storage the various modules access. The software system also includes a test and diagnostic module 92.

The control blocks 86 are stored in random access memory. The control block 86 each store communication dependent information. A common communication processing routine stored in read-only memory, in conjunction with the control blocks 86 services each of the local units.

Figure 5A:
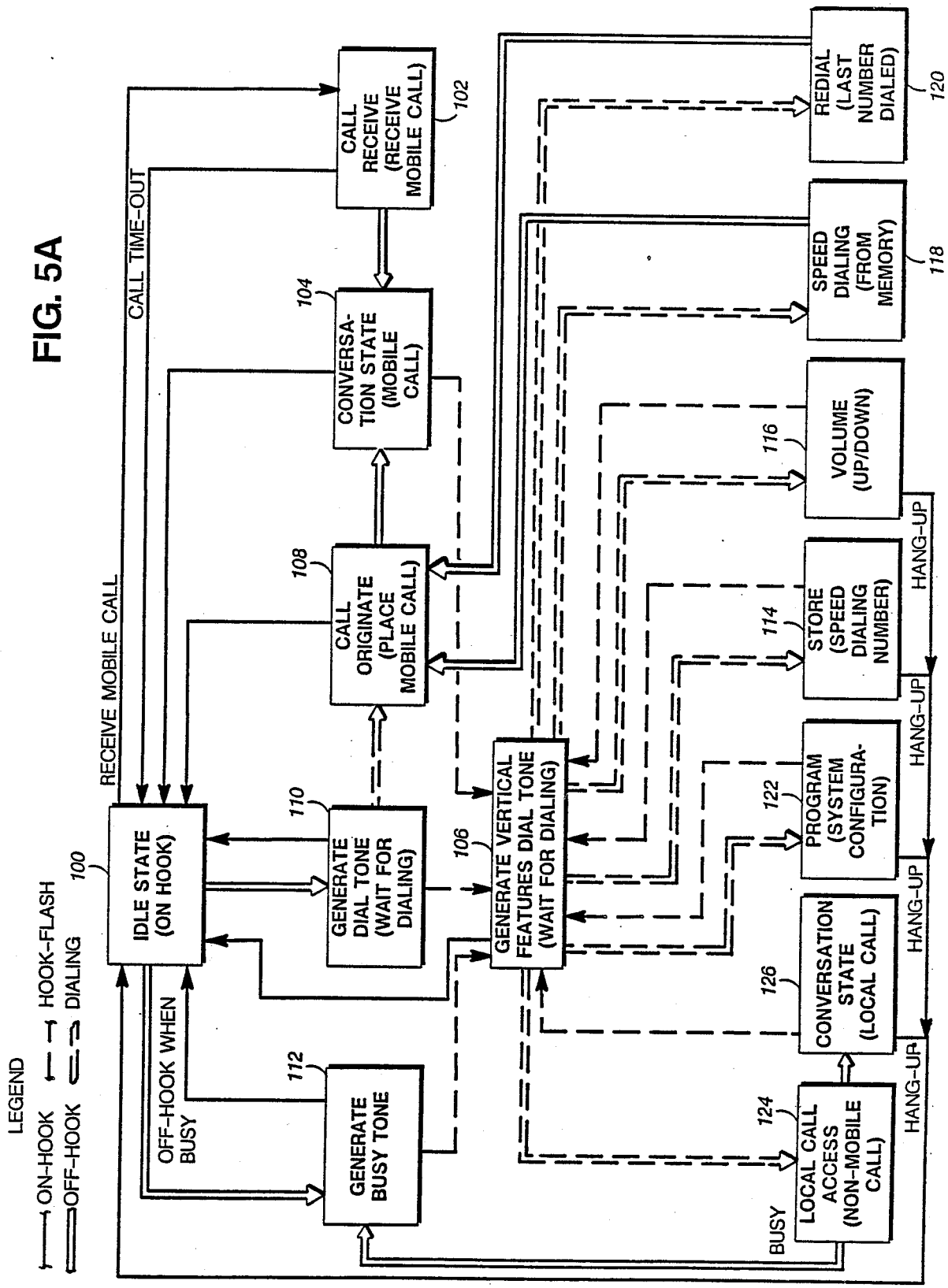
FIGS. 5A through 5O are flow diagrams illustrating operation of the hardware and software of the system of FIG. 2.
Figure 5B:
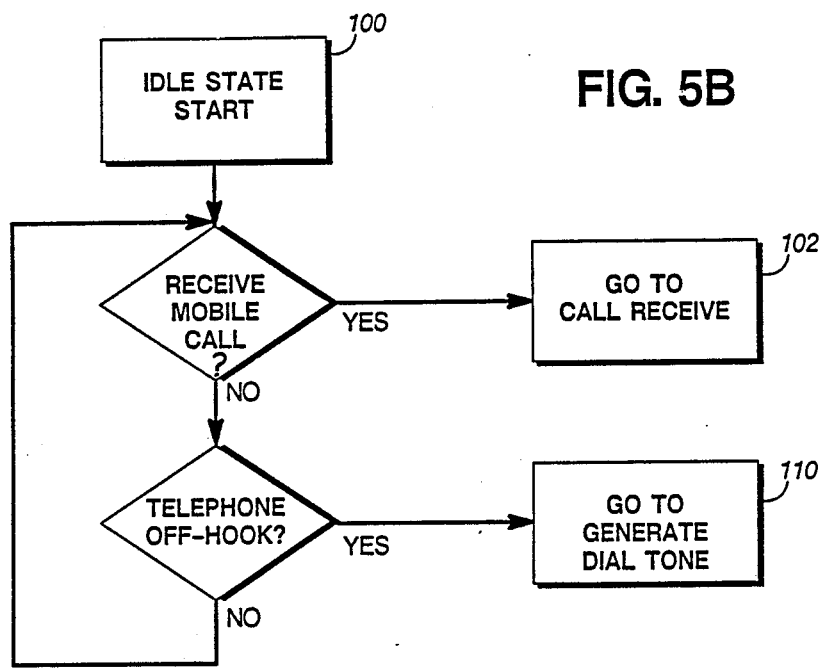
Figure 5C:
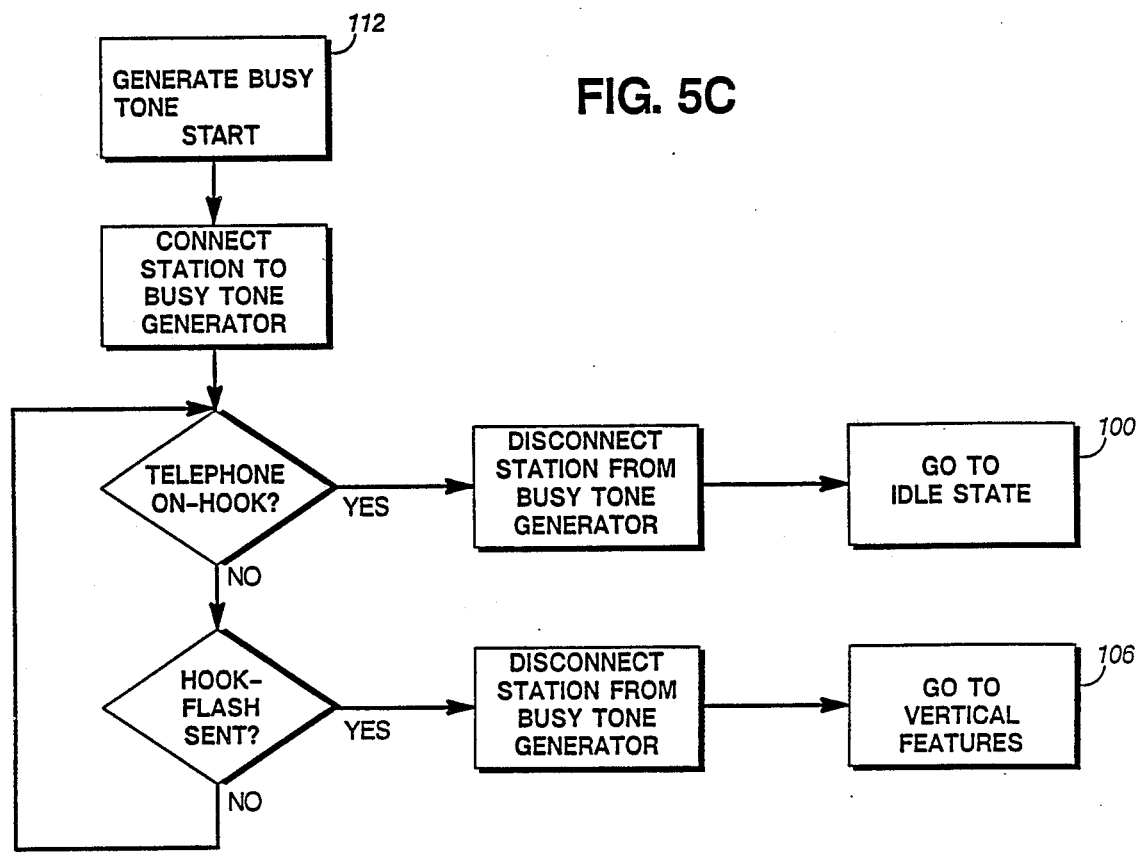
Figure 5D:
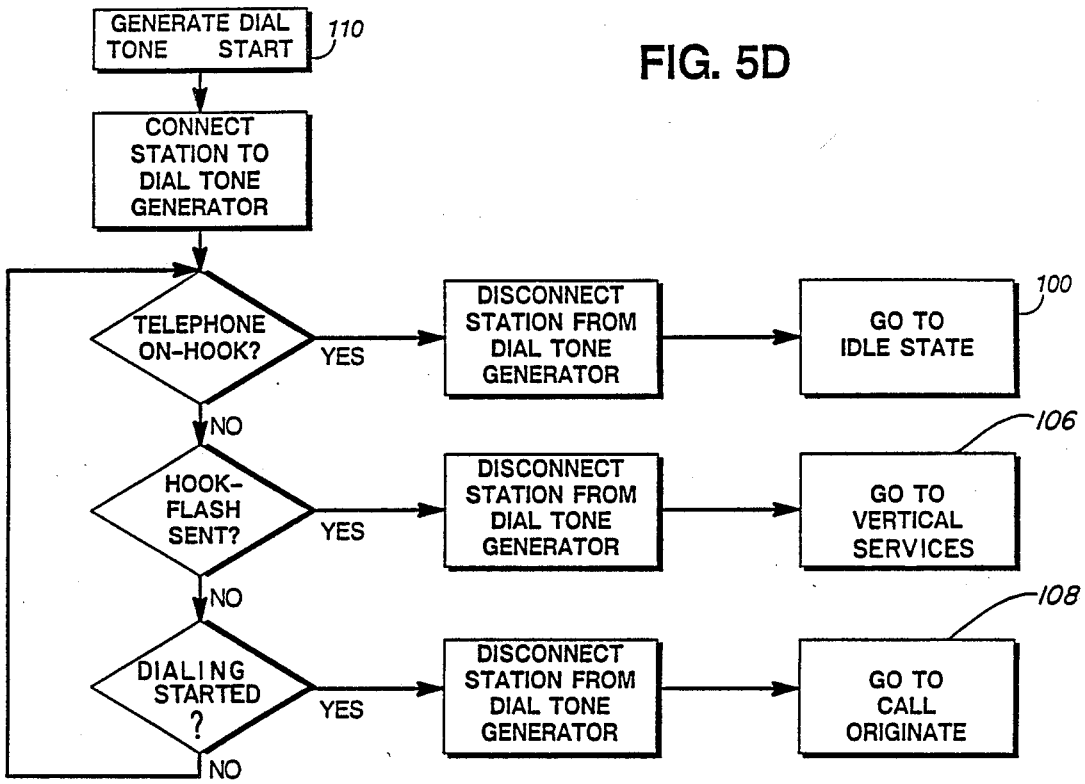
Figure 5E:
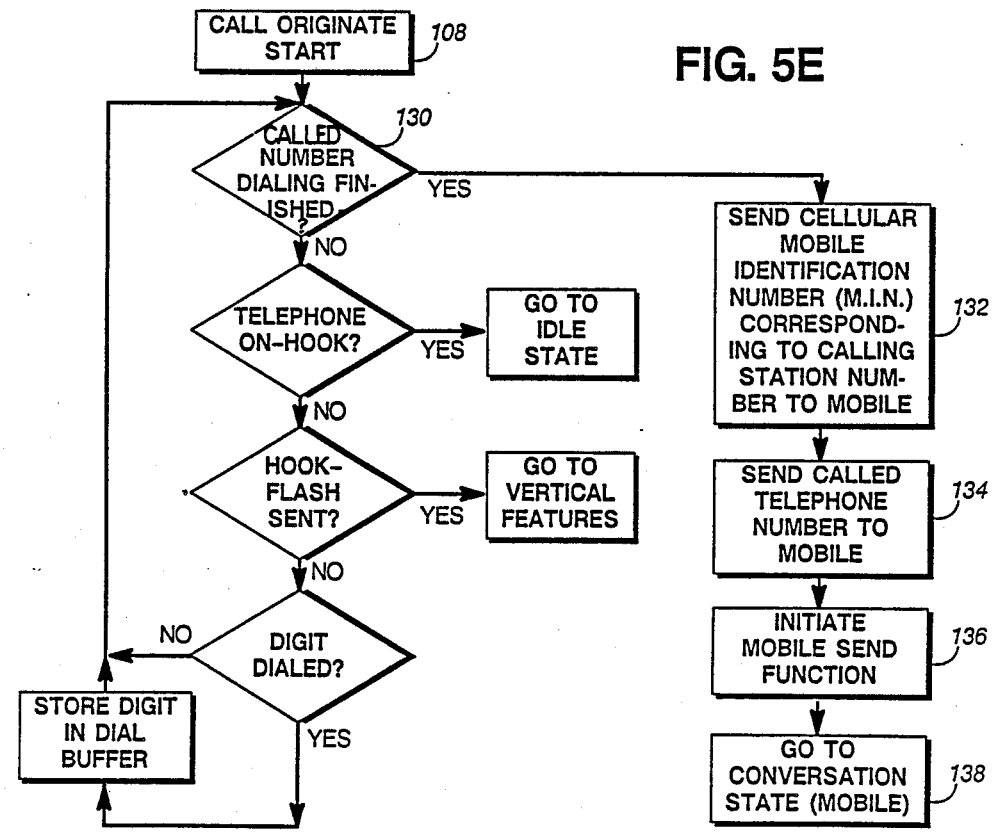
Figure 5F:
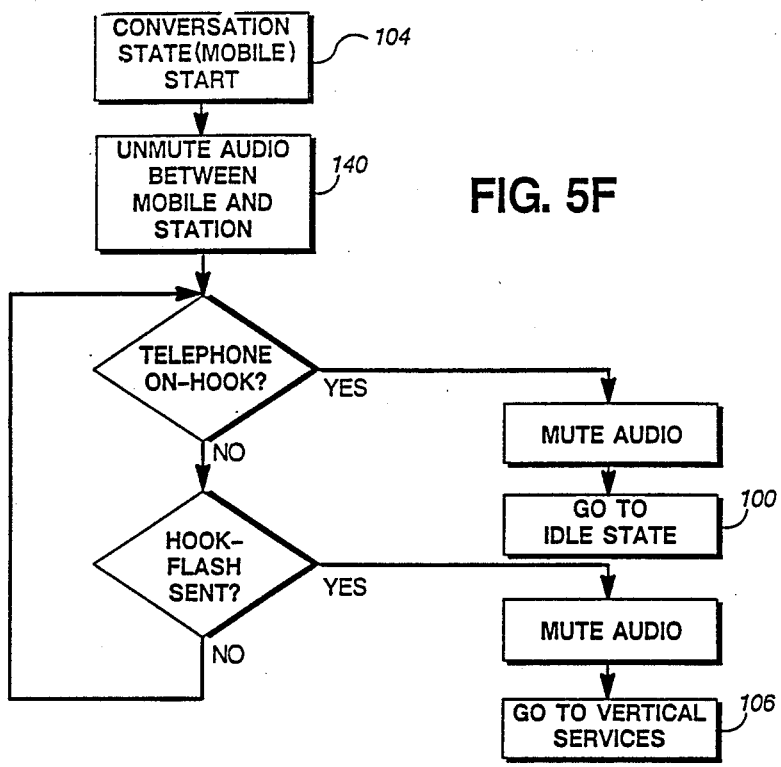
Figure 5G:
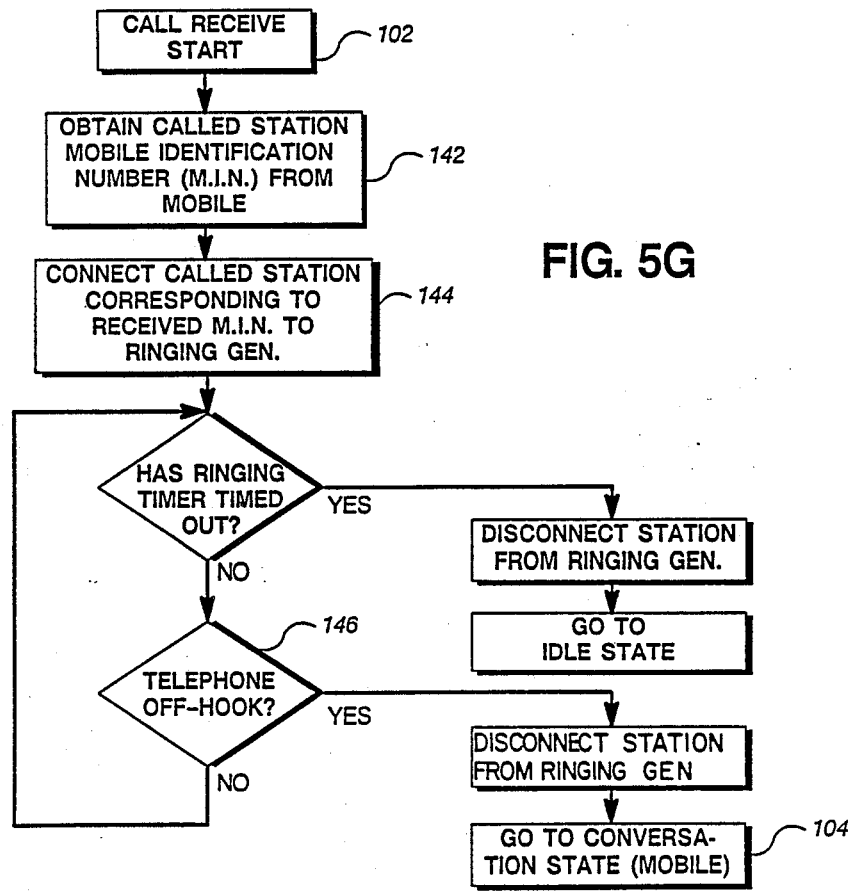
Figure 5I:
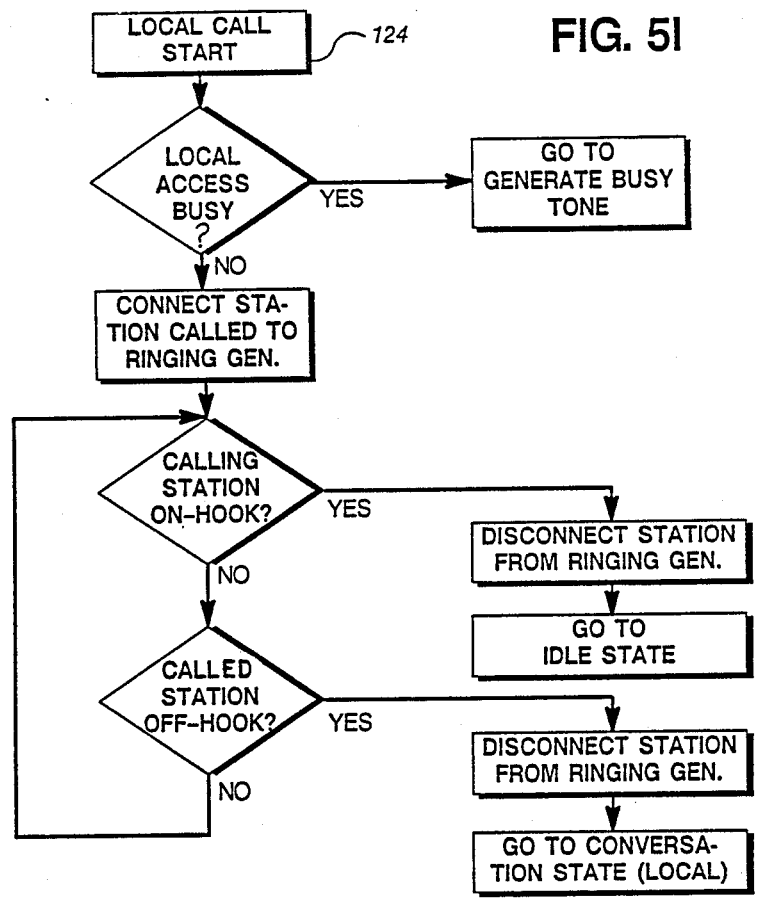
Figure 5J:
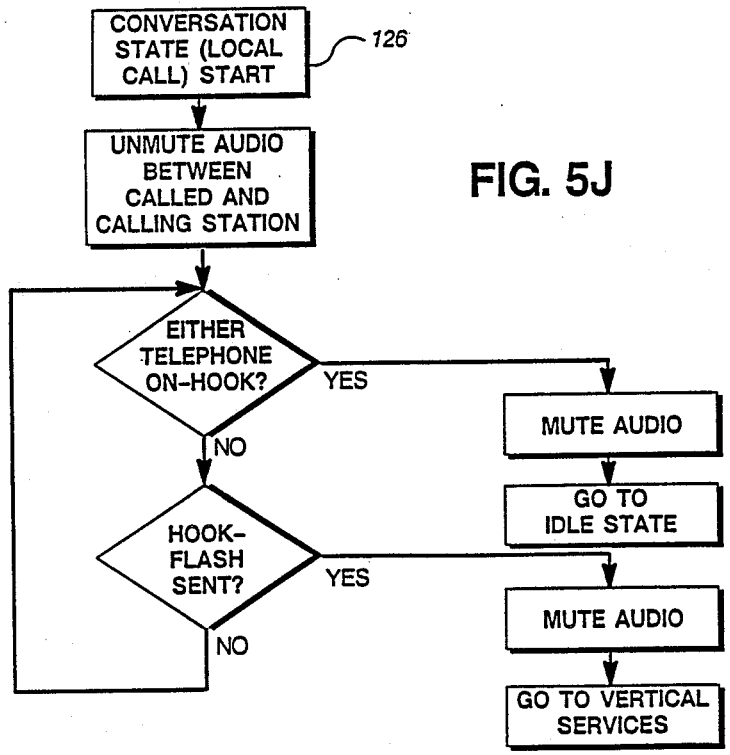
Figure 5K:
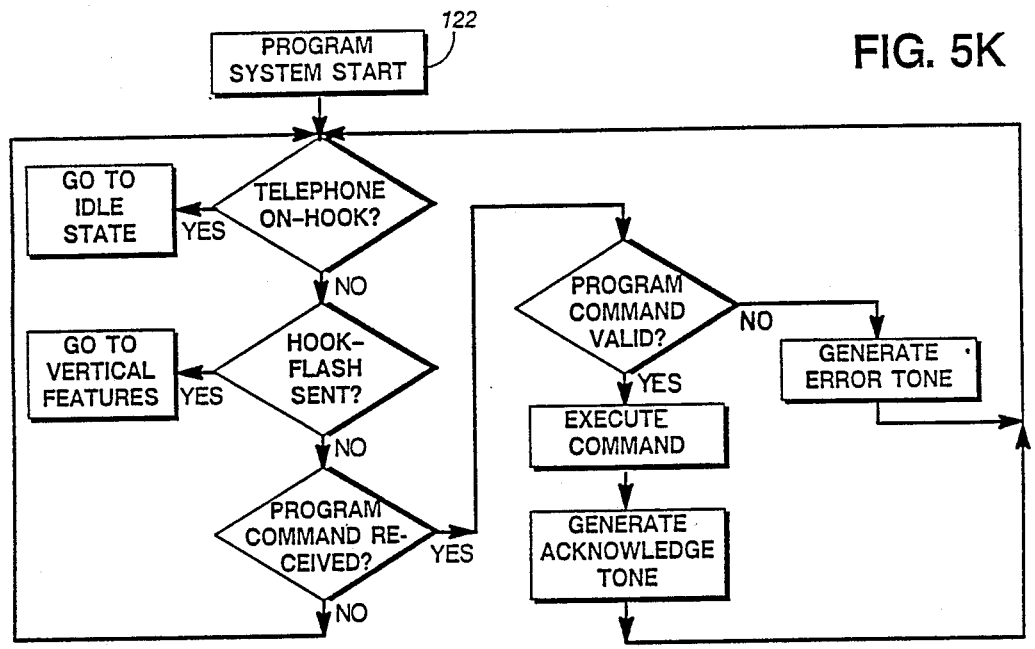
Figure 5L:
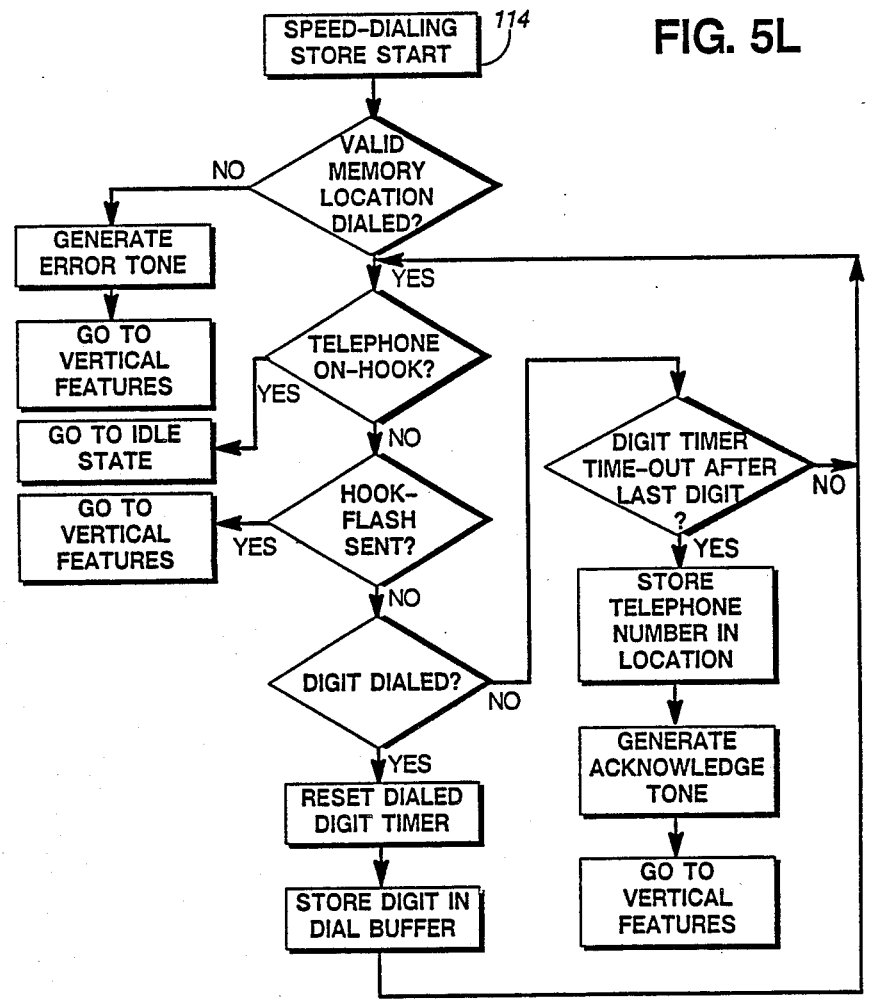
Figure 5M:
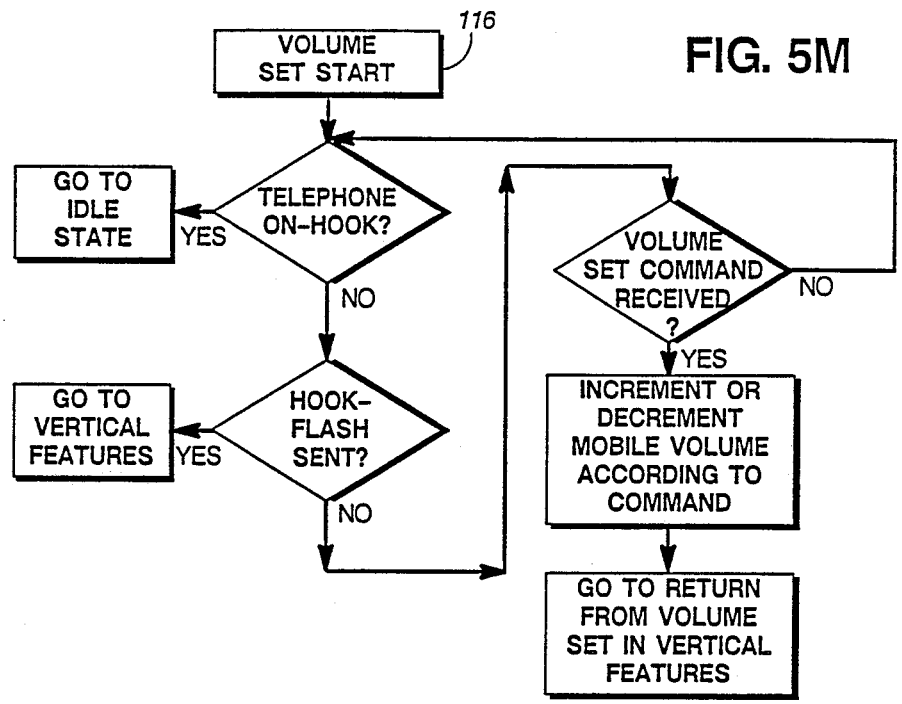
Figure 5N:
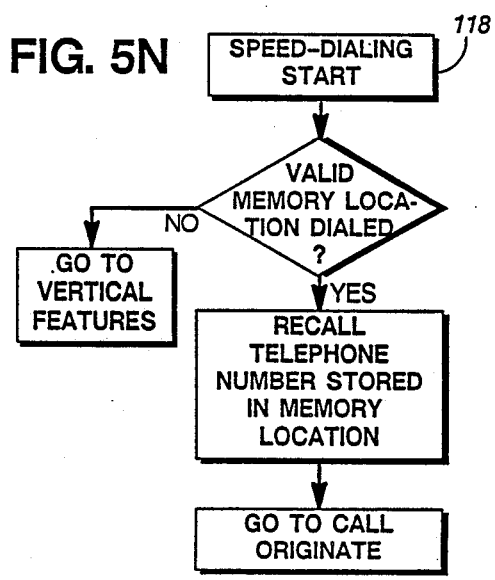
Figure 5O:
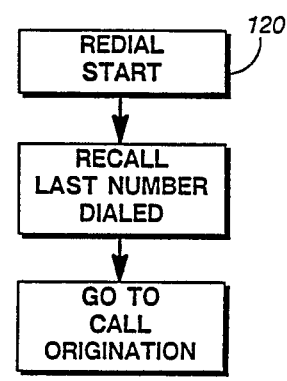

FIGS. 5A-5N are a set of flow diagrams illustrating the operation of the hardware and software of FIGS. 3 and 4. As illustrated in FIG. 5A, the remote station 60 has an idle state wherein the programmable processor 32 waits until it receives an interrupt indicating that communication services are to be provided. In the flow diagrams of FIGS. 5A-5N, the phrase "mobile call" refers to communications that are received from or transmitted to the transceiver 62 by the remote station 60. Such communications originate or terminate at the remote and line telephone system.

For example, processor 32 exits the idle state 100 in response to transceiver 62 having received an incoming identification number, or telephone number, which matches one of the set of predetermined encoded identification numbers. In such an instance, the processor switches into a call receive state 102 to carry out incoming call or communication processing. Upon receipt of the incoming identification number and upon receipt that the local unit has been activated, such as receipt of an off hook signal, the processor 32 switches from the call receive state 102 to a conversation state 104. While in the conversation state 104 a request may be made to provide vertical services. In this instance, the processor 32 switches into a vertical service providing state 106. In the event that the processor 32 is in its idle state and a member of the plurality 68 is activated, such as by generating an off hook signal, the processor 32 switches to a call or message originate state 108. In the call or message originate state 108, an outgoing communication can be processed through the transceiver 62. The processor 32 in this state accumulates an outgoing identification number, which ultimately corresponds to a station or telephone unit coupled to the remote land line telephone system. Upon initiation of communications via the transceiver 62 to the remote land line telephone system, the processor 32 switches to the conversation state 104.

The processor 32 also includes a dial tone generating state 110 and a busy tone generating state 112. Further, the processor 32 also includes vertical service states 114 through 120, system configuration state 122 and local call access and conversation states 124 and 126. Subsequent flow diagrams on FIGS. 5B-5N illustrate the implementation of the control software of the processor 32 to carry out the various processing functions of FIG. 5A.

For example, the flow diagram of FIG. 5B illustrates the steps of the processor 32 when in the idle state 100, in response to receiving a signal from the transceiver 62 indicating an incoming call. This causes the processor 32 to switch to the call receipt state 102. Alternately in the event that the processor 32 senses a local unit going active, such as a telephone going off hook or some other type of unit generating an "off-hook" signal, the processor switches to the dial tone generating state 110.

FIG. 5C is a flow diagram illustrating the steps of the busy tone generation state 112. FIG. 5D illustrates a flow diagram for the dial tone generation state 110. As can be seen from FIG. 5D, the vertical services state can be entered by generating a brief current interruption in the local unit interface, equivalent to momentarily depressing the hook switch of a telephone.

FIG. 5E illustrating the steps of the call originate state 108 is a flow diagram wherein the communication or call is initiated by a local unit to be transmitted via the transceiver 62 to the remote land line telephone system. As illustrated in FIG. 5E, the processor 32 accumulates the incoming identification number in a step 130. Subsequent to having received a complete identification number, which can be determined by counting incoming digits from the local unit or can be established by a time-out feature, the processor 32 transmits to the transceiver 62 the identification number of the calling unit. Hence, the remote station 60 has the ability to supply via the transceiver 62, a plurality of different calling unit identification numbers, to the remote land line system depending on which member of the plurality 68 is initiating the communication. Subsequently in a step 134, the outgoing identification or telephone number is transmitted to the transceiver 62. The processor 32 then initiates the mobile or transceiver send function in a step 136. The processor 32 then switches into the conversation state 104 and provides a bidirectional audio communication path between the active local unit and the transceiver 62.

FIG. 5F is a flow diagram illustrating the steps of the conversation state 104 including providing an audio communication path in a step 140. It should be noted that in the conversation state 104 by momentarily creating a hook switch signal such as can conventionally be done with a telephone by depressing the hook switch temporarily, the processor 32 will switch from the conversation state 104 into the vertical service state 106. The vertical service state 106 can be entered by use of the hook flash signal or its equivalent.

FIG. 5G is a flow diagram of the steps of the call receive state 102. When a call has been received via the transceiver 62, the processor 32 in a step 142 obtains the incoming identification number from the transceiver 62. Upon receipt of the incoming identification number, the processor 32 in a step 144 couples the respective local unit from the plurality 68 to the ringing generator to initiate activation of that unit. Upon sensing that the local unit has gone off hook in a step 146, the ringing generator is disconnected and the processor 32 switches into the conversation state 104.

Hence, it will be understood that the remote station 60 has the ability to sense and utilize a plurality of incoming identification numbers. Similarly, the station 60 has the ability to transmit via the transceiver 62 to the remote base station a plurality of identification numbers corresponding to the local unit initiating a communication.

FIG. 5H is a flow diagram of the steps of the vertical service state 106. In particular, in a state 160 a volume adjusting service request can be sensed which causes the processor 32 to switch to a volume adjusting state 162. In a step 164, a request for speed dialing can be sensed which causes the processor 32 to switch to a speed dialing state 166. In a step 168, a last number redial service request can be sensed which causes the processor 32 to switch to a last number redial state 170.

Additional features can be sensed in a step 172 to cause the processor 32 to switch to a new feature state 174. This new feature state could include call forwarding or call waiting or other types of desirable vertical services.

The flow charts of FIGS. 5I and 5J illustrate the steps of the local communication initiation and conversation states 124 and 126. In the present instance, "local communication" refers to communication between members of the plurality 68. Such communication does not utilize the transceiver 62. The phrase "local communication" is not limited to communication between units which are physically close to one another.

The flow diagram on FIG. 5K discloses steps of the programming state 122. The programming state 122 is used for the purpose of local configuration of the remote station 60. Local programming can include restricting outgoing dialing capabilities or other similar services.

The flow diagrams of FIGS. 5L-5N illustrate steps associated with providing storing of speed dialing numbers as in state 114, adjusting station volume, as in state 116, and the process of speed dialing as in state 118.

Figure 6A:
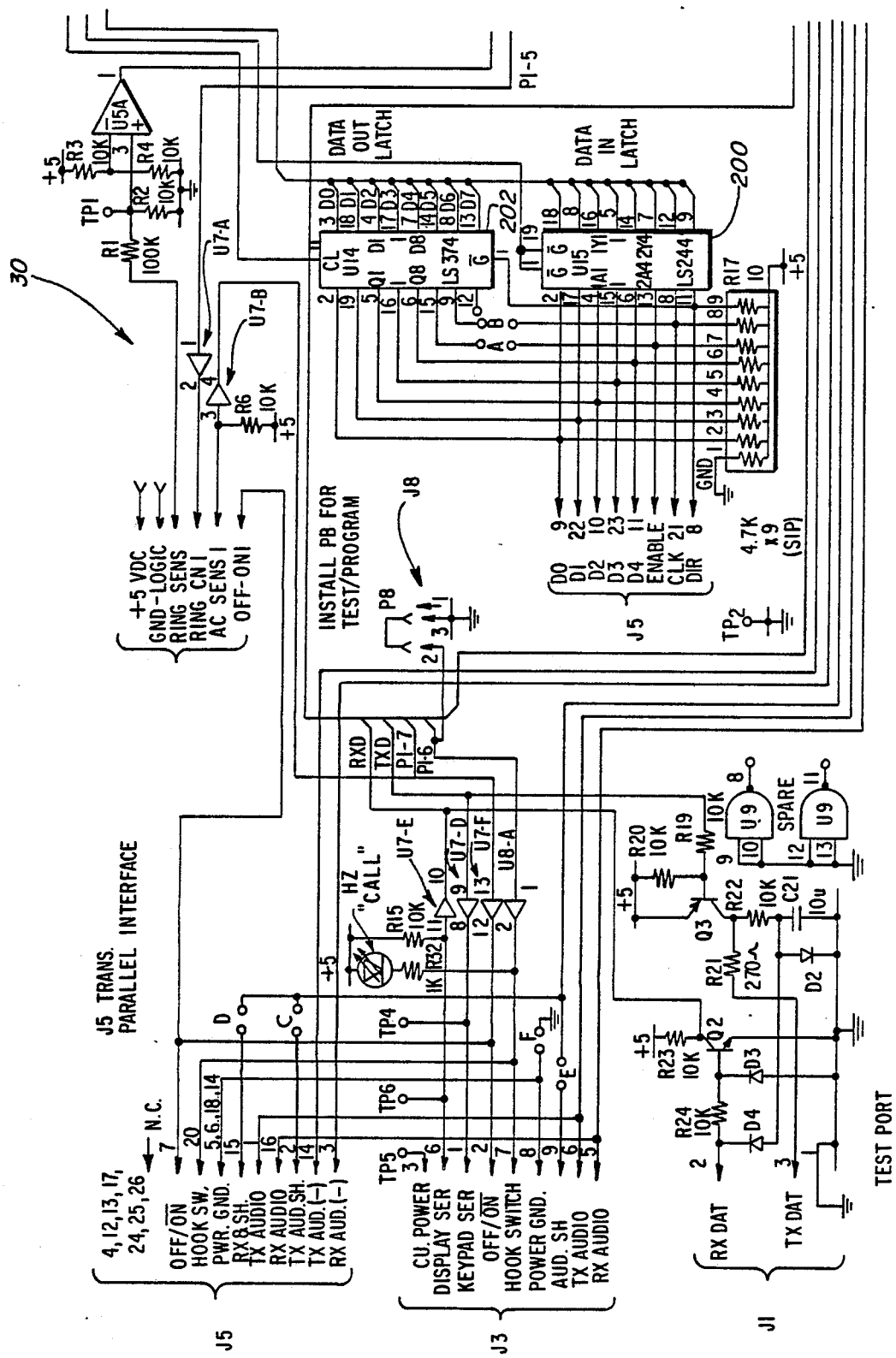
FIGS. 6A, 6B and 6C together are a schematic diagram of the logic unit for the control unit of FIG. 2.
Figure 6B:
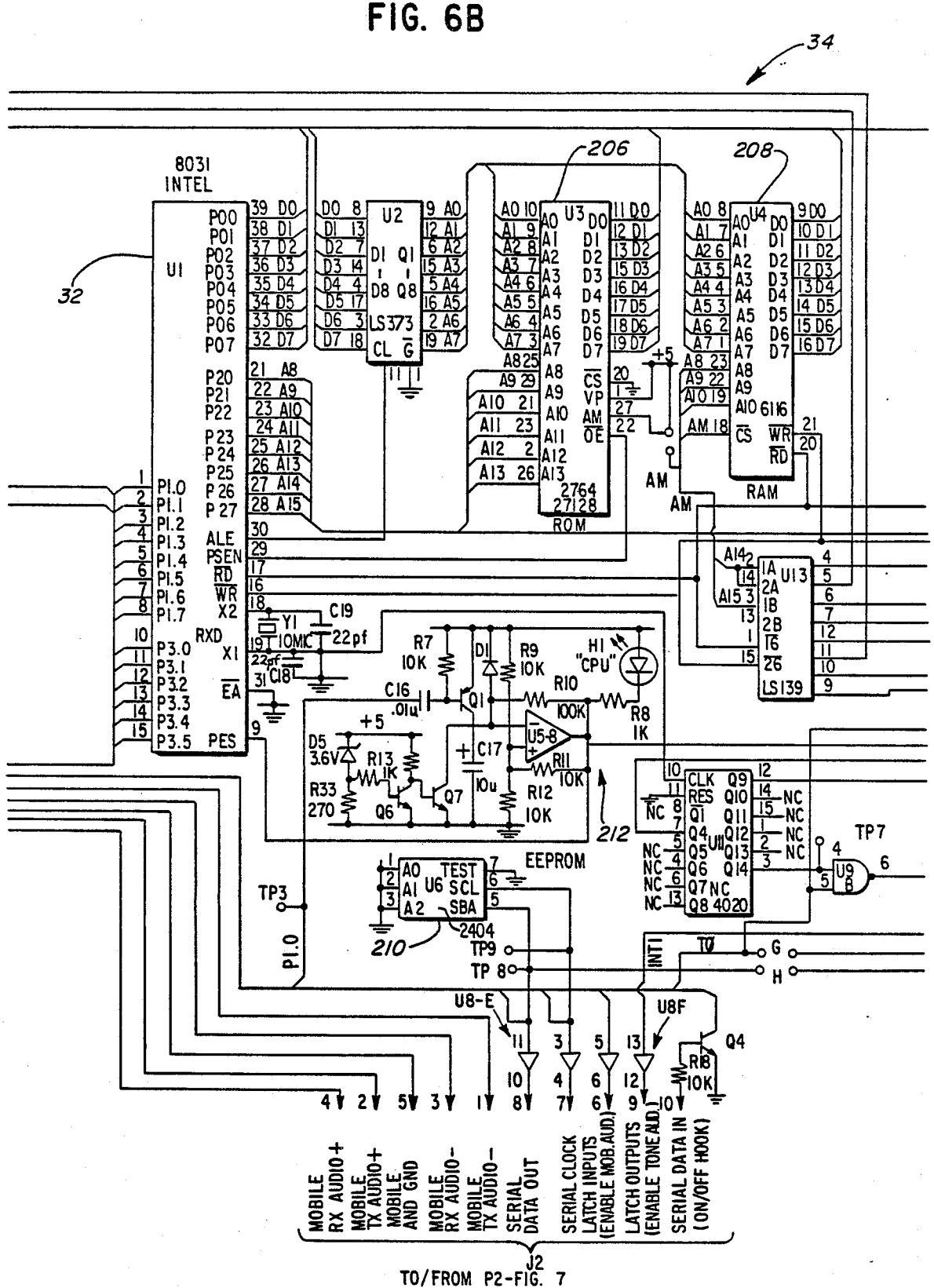
Figure 6C:
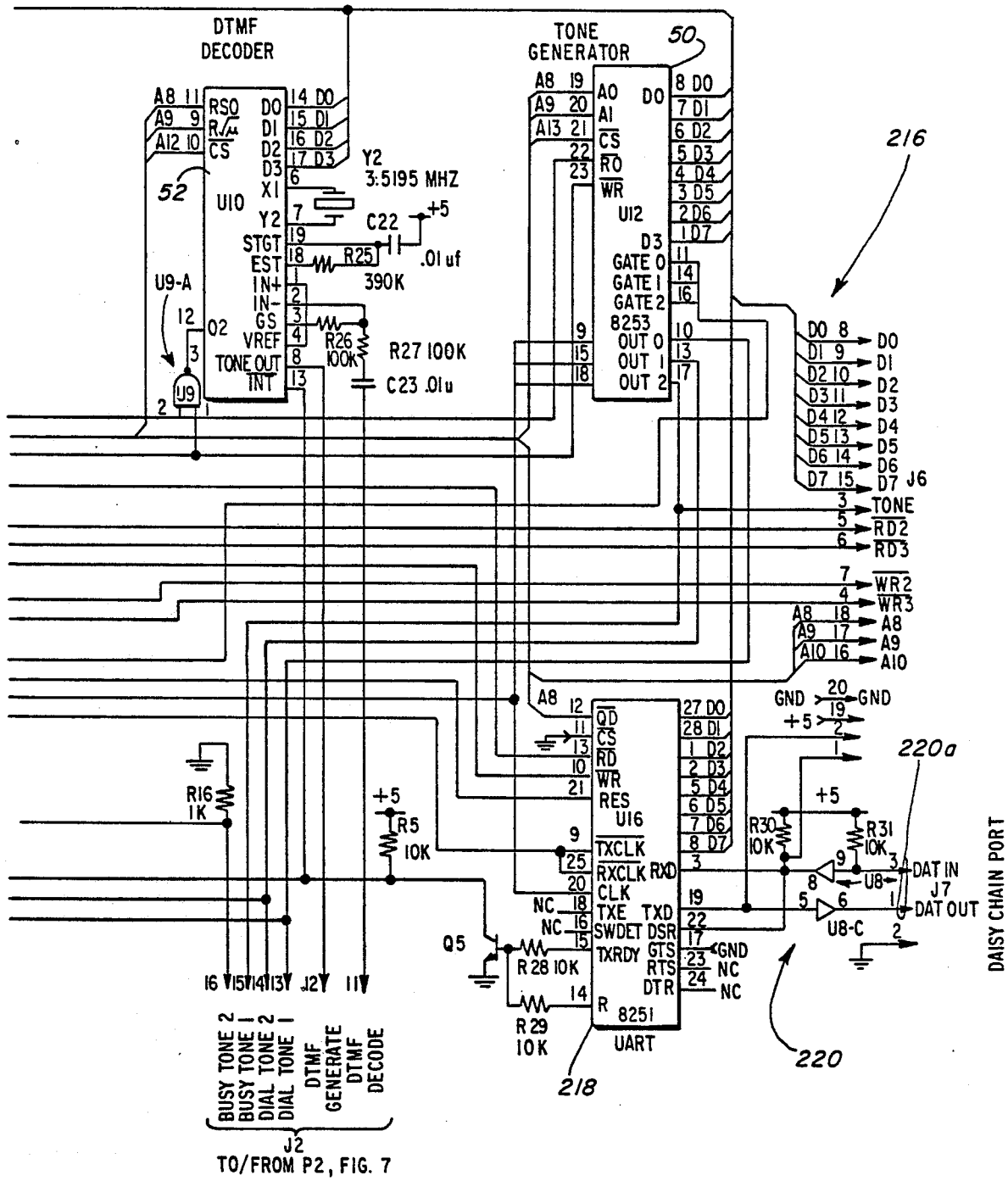

FIGS. 6A-6C together form a detailed schematic diagram of the remote station 60 of FIG. 3. J3 which is indicated on FIG. 3 is a pluggable connector located between the control part of the radio telephone 62 and the control unit 64. Connector J3 is coupled into a serial interface of the input/output control circuitry 30. Connector J5 illustrated on FIG. 6A is coupled to a parallel interface, usable as an alternate to the serial interface of connector J3, where the transceiver 62 provides parallel input and output. Connector J1 illustrated on FIG. 6A is a test port interface of the RS232 type usable for diagnostic and testing purposes. The input/output control circuitry 30 includes input data latch 200 and output data latch 202 used for temporary storage of incoming and outgoing data from and to the transceiver 62.

The programmable processor 32 an INTEL 8031 is illustrated, coupled to storage unit 34. The storage 34 includes 8 or 16K of read-only memory (ROM) 206 and 2K of random access memory (RAM) 208. The control program for the processor 32, described previously, would be stored in the read-only memory 206.

Additional memory is provided in EEPROM 210, a 4K bit memory with serial I/O. Memory unit 210 could be a Xicor .2404. Speed dial numbers can be stored in memory unit 210. Connector J2 to and from the audio unit 66 is illustrated in part on FIG. 6B.

As can be seen from FIG. 6C, programmable tone generator 50 and DTMF decoder 52 are also coupled to processor 32 and operate under its control. Other circuitry on FIGS. 6B and 6C are part of the line interface control circuitry 36 and the audio control circuitry 38. Power on/reset circuitry 212 provides a reset function when the unit is first turned on and also provides for low voltage sensing. Input/output port 216, via connector J6 provides for expansion to other devices.

UART 218 provides for input/output communication between other, similar remote stations. Port 220 via connector J7 can be used to provide a daisy chain priority establishing input/output as described subsequently. Pluggable connector J2 indicated in part on FIG. 6C provides a communication path to and from the audio unit 66.

Figure 7A:
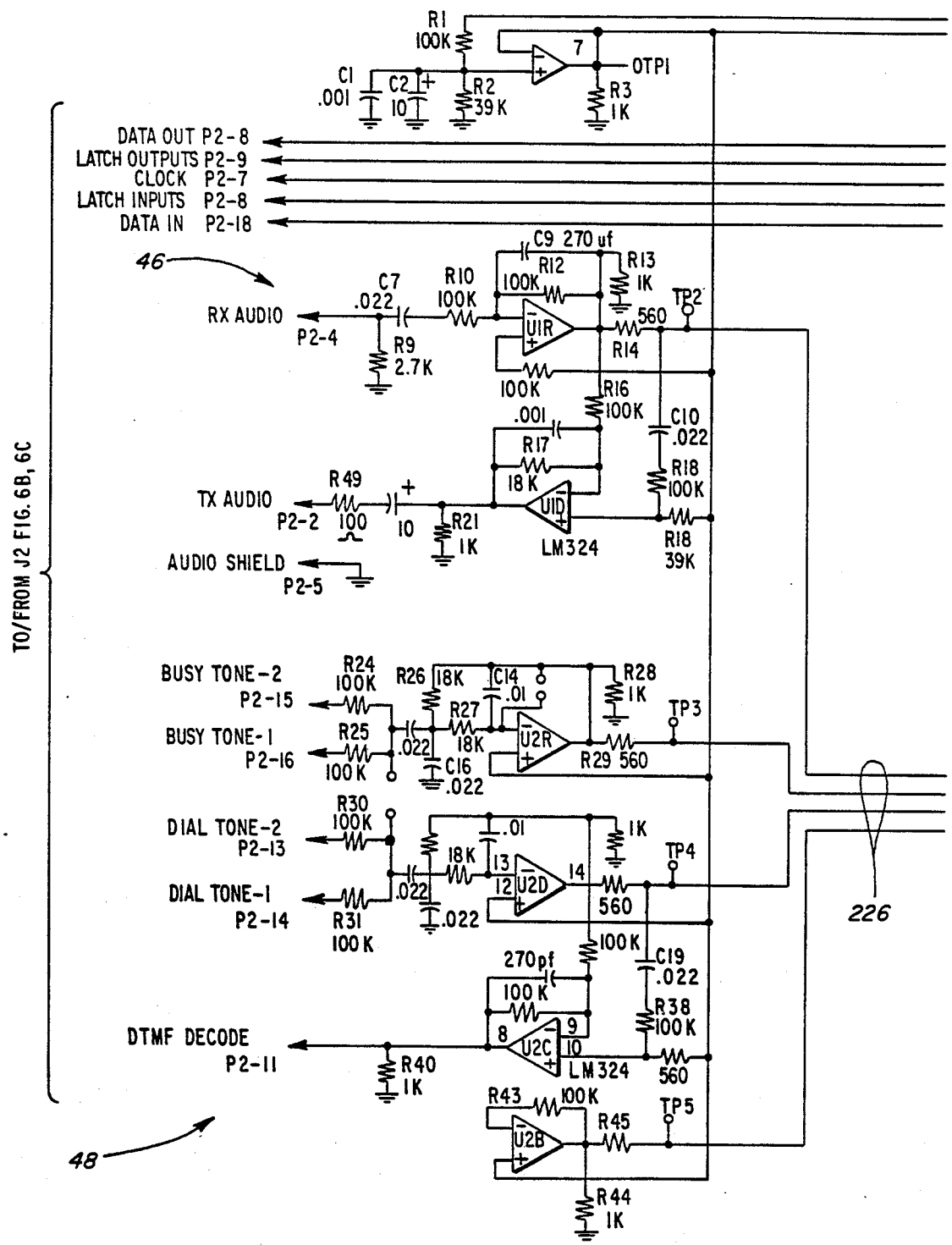
FIGS. 7A, 7B and 7C together are a schematic diagram of the audio unit of FIG. 2.
Figure 7B:
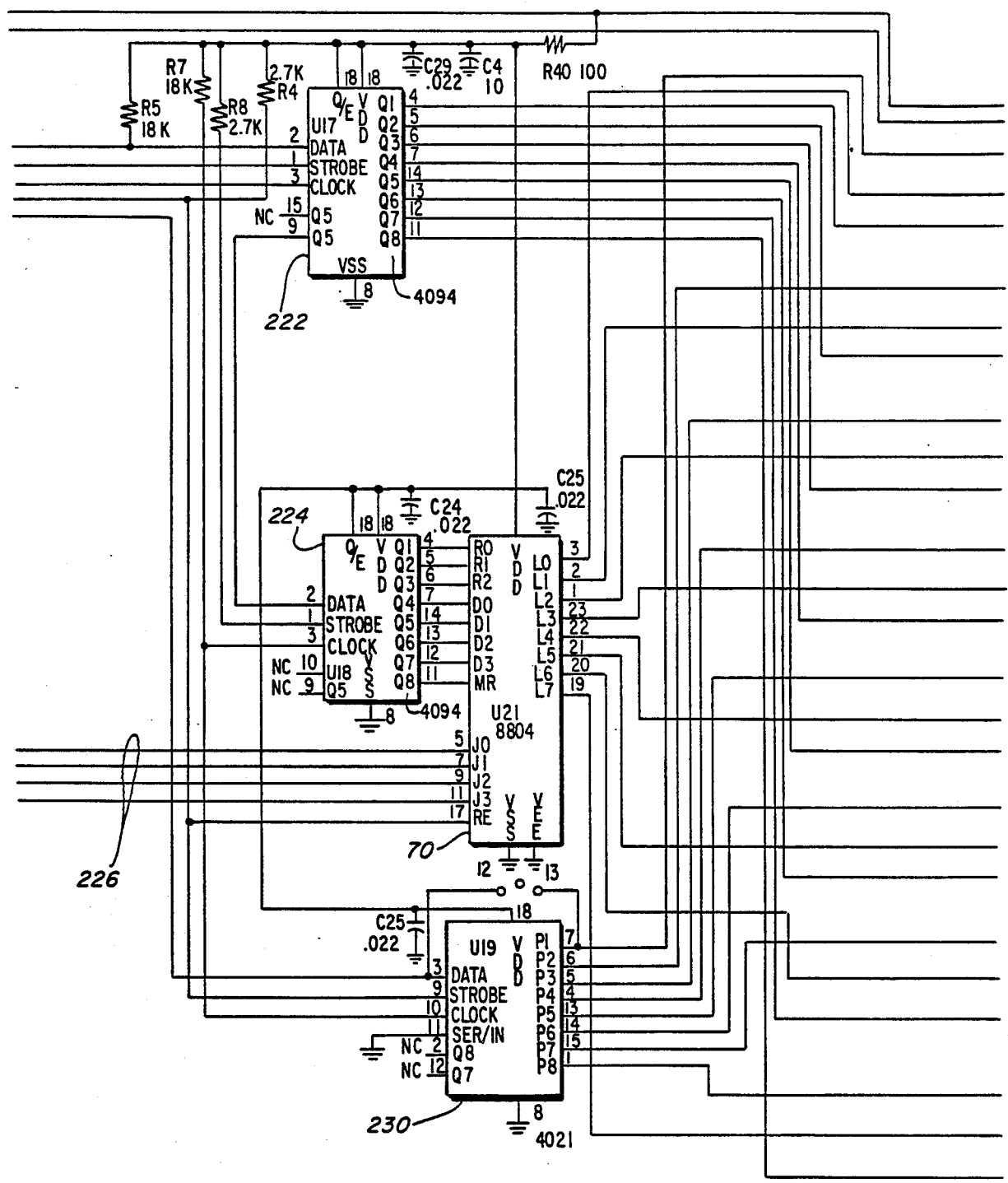
Figure 7C:
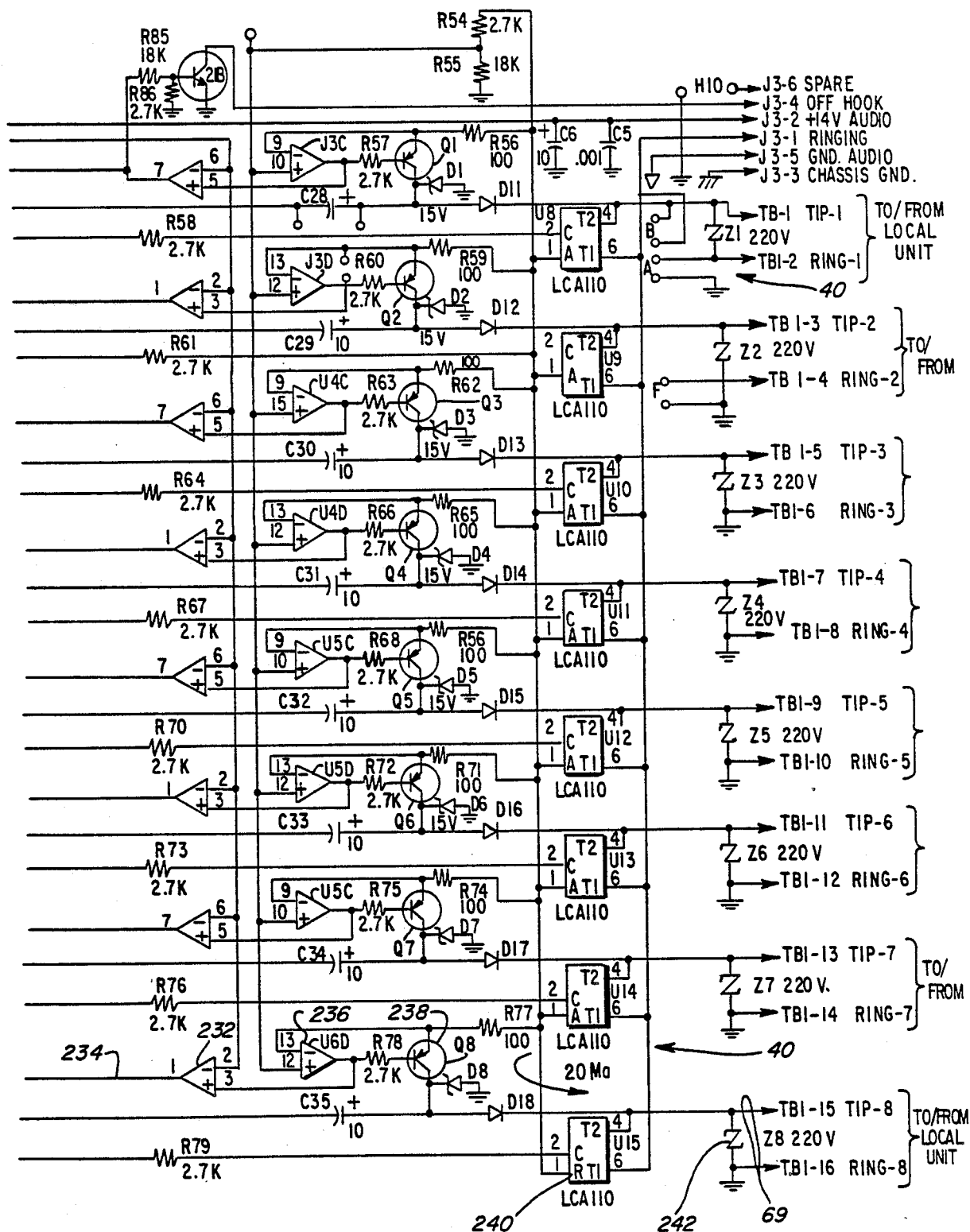

FIGS. 7A-7C together represent a detailed schematic of the audio unit 66. As illustrated on FIG. 7A, the 4-2 hybrid 46 and tone interface hybrid 48 can be implemented by means of LM324 operational amplifiers. These inputs and outputs are coupled through connector J2 to the control unit 64.

As illustrated on FIG. 7B, control inputs to the cross-point switch matrix 70 are provided via serial in/parallel out circuit element 224. Serial to parallel converter 224 provides 8 control inputs to the cross-point switch 70. Four additional audio inputs and outputs are provided to the cross-point switch 70 on a plurality of lines 226. Signals on the lines 226 are generated respectively by the transmitter audio input on connector J2 conductor 4, from the busy tone inputs from connector J2 on conductors 15 and 16, and from the dial tone inputs from connector J2 on conductors 13 and 14. Element 230 illustrated on FIG. 7B, a parallel in/serial out shift register is utilized to sense and transmit off-hook and dial pulse information to the control unit 64.

FIG. 7C illustrates a plurality of line interface circuits 40. A typical line interface circuit 40 includes an operational amplifier 232 whose output on a line 234 provides a zero volt signal when the associated unit is inactive, corresponding to a telephone being on hook, and a plus 12 volt signal when the corresponding unit goes active, corresponding to a telephone going off hook.

The line interface also includes an operational amplifier 236 and drive transistor 238 which provide a 20 mil current source for the corresponding communication unit. Each line interface 40 also includes a ringing voltage switch 240, such as a Theta J LCA110. Serial in/parallel out circuit element 222 provides selective drive signals to various of the ringing generator switches 240.

Varistor 242 provides voltage suppression to protect the interface circuitry 40 from transients generated on the lines to the communication unit. Hardwired jumpers A and F are inserted for the remote station 60. Hardwired jumpers A and B are inserted for the remote station 10.

The line interface circuitry 40 is coupled via 2 wire pair 69 to and from the corresponding local unit. As noted previously, the corresponding communication unit may be located physically adjacent the remote station 60 or it may be located a substantial distance away therefrom. The fact that a 2 wire pair 69 is illustrated coupling the communication unit to a corresponding line interface unit 40 is only exemplary. The 2 wire pair 69 could be replaced or be in series with a microwave or radio link. Additionally, the 2 wire pair 69 could have a substantial physical length if desired. In view of the fact that all of the line interface units 40 are identical, the above description is applicable to the remainder of all such units on FIG. 7C.

It will be understood that the single unit remote station of FIG. 1 could be implemented as illustrated in FIGS. 6 and 7 with appropriate simplifications in view of the fact that the remote station 10 provides services only to a single communication unit 12.

With respect to the flow diagrams of FIGS. 5A-5N which depict the operational sequence of the multiple unit remote station 60, similar flow diagrams are applicable to the single unit remote station 10 of FIG. 1. In contradistinction to FIG. 5A which discloses an overall sequencing of operations of the remote station 60, a corresponding diagram for the remote station 10 would be essentially identical except at the single unit remote station of FIG. 1 would not include local call access capability corresponding to states 124 and 126 of FIG. 5A. Further, with respect to FIG. 5E the call originate sequence corresponding to state 108, the remote station 10 of FIG. 1 would not send the identification number of the unit originating the transmission as in step 132 since there is only one unit associated with the remote station 10. In this instance, the transceiver 14 would have previously received an encoded representation of the identification number of the unit 12. Hence, the transceiver 14 would be able to send the identification number for the unit 12 without having to receive it from the corresponding control unit 16.

With respect to the flow diagram of FIG. 5G, it would not be necessary for the remote station 10 to obtain the call station identification number from the transceiver as in step 142. Once the transceiver 14 recognizes an incoming identification number, the processor 32 would only have to switch on the ringing generator.

With respect to the flow diagram of FIG. 5H, implementation of the vertical feature state 106 for the remote station 10 would be be essentially identical to that for the remote station 60 with the exception of the fact that there is no capability by the unit 12 to access another unit coupled to the remote station 10. For the same reasons, flow diagrams 5I and 5J have no applicability to the remote station 10 since they are directed to implementing calls which are local to the remote station and do not utilize the transceiver. With the exception of the above-noted changes, the flow diagrams of FIGS. 5A-5N are applicable to the single unit remote station 10 of FIG. 1.

Figure 8:
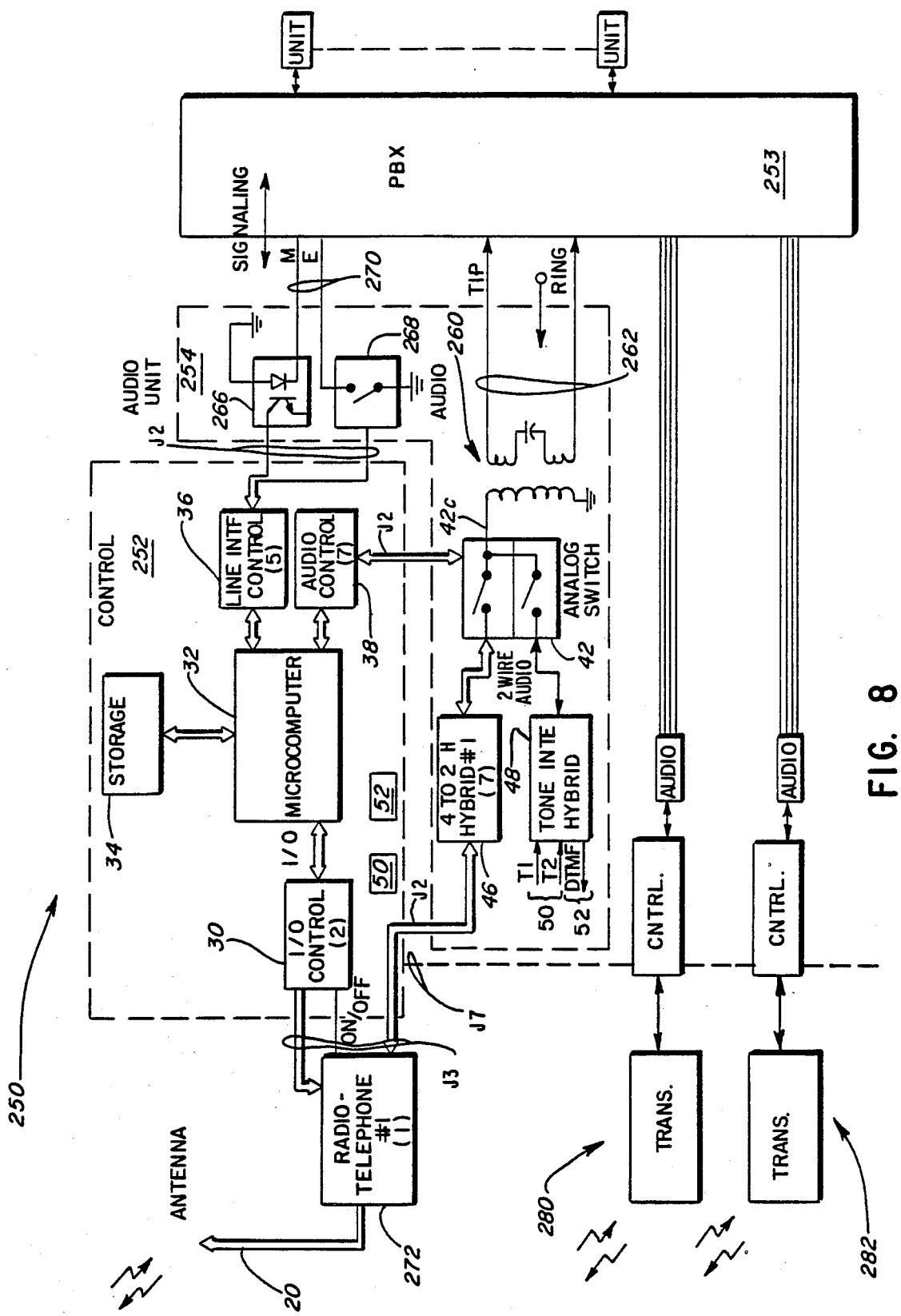
FIG. 8 is an overall hardware block diagram of a cellular remote station coupled to a PBX unit.

A further embodiment of the present invention is illustrated in the block diagram of FIG. 8. A remote station 250 is illustrated in FIG. 8. The remote station 250 emulates a trunk level interface and provides services to and receives information from a private branch exchange (PBX) 253. The remote station 250 includes a control unit 252 which includes essentially the same circuitry as does the control unit 64 of the remote station 60. However, the control program used in the control unit 252 would be substantially different from the control program used in the control unit 64.

Coupled to the control unit 252 is an audio unit 254. The audio unit 254 includes hybrids 46 and 48 of a type discussed previously. Additionally, the audio unit 254 includes an analog switch 42 of the type discussed previously which could be implemented as a 4066 CMOS Switch.

Coupled to an output 42C of the analog switch 42 is a transformer 260. The output of the transformer 260 provides an electrical path for the transmission and reception of audio signals on lines 262. Lines 262 correspond to the tip and ring inputs to the PBX 252. In this embodiment, the PBX 253 corresponds to a selected local unit notwithstanding the fact that the PBX 252 is in turn coupled to other communication units.

Additionally, the audio unit 254 includes an incoming optical isolater 266 and an outgoing solid state relay 268. The optical isolater 266 and the solid state relay 268 are coupled to incoming and outgoing signaling lines 270, M and E leads of the PBX 253.

Signaling and audio requirements for the PBX 253 are established in EIA standard RS 464 and its addenda. Consistent with that EIA specification, the remote station 250 emulates a trunk level interface and provides the appropriate E lead signals to the PBX 253, and responds to M lead signals from the PBX 253.

The remote station 250 also includes a transceiver 272. The transceiver 272 is identical to the transceiver 62 with the exception that the transceiver 272 has a much larger number of predetermined identification numbers which can correspond to communication units coupled to the PBX 253. For example, the transceiver 272 would be able to be able to respond to over 1000 different incoming identification numbers. As was the case with the remote station 60, an identification number determined by the transceiver 272 to be one of those in its list of predetermined identification numbers is transmitted to the control unit 252 for further processing.

In functioning as a trunk level interface with respect to the PBX 253, the remote station 250 forwards to the PBX 253 appropriate portions of the received and detected predetermined identification number for processing by the PBX. The PBX in turn provides further switching and control signals to the communication units coupled thereto. It will be understood that while the remote station 250 is illustrated in FIG. 8 coupled directly to the PBX 253 that this is not a limitation of the present invention. The 2 wire pairs 262 and 270 could be replaced by radio or microwave links to provide equivalent communication between the remote station 250 and the PBX 253. Hence, the remote station 250 and the PBX 253 which is receiving services therefrom could in fact be physically displaced from one another by great distances.

In order to permit what might be a large number of communication units coupled to the PBX 253 to carry out, simultaneous communications, a plurality of additional remote units 280 and 282, coupled to the PBX 253 and identical to the remote unit 250 can be provided. Each of the units 280 and 282 includes a transceiver such as a transceiver 272 which can respond to a large number of predetermined identification numbers.

In view of the fact that all of the transceivers will be available to receive an incoming identification number, assuming none are already engage in an ongoing communication, its necessary to establish a priority system such that only one of the transceivers will respond to the incoming identification number. Such a priority chain can be established by coupling lines 220a of the output port 220 via connector J7 between remote stations as illustrated in FIG. 8.

With this hard wire priority arrangement, remote station 250 would respond to an incoming identification number initially. Remote station 280 would not respond to a valid incoming identification number until it received a signal on its input line of the pair 220a from remote station 250 indicating that remote station 250 was unavailable. At that time, on receipt of an enabling signal on the input line of the pair 220a the remote station 280 would respond to the incoming valid identification number. Similarly, remote station 282 would not respond to either the first or the second incoming identification numbers but would respond to a third incoming identification number upon receiving on an input line corresponding to the line pair 220a from the remote station 280 indicating that both the remote station 250 and the remote station 280 were actively engaged in an ongoing communication sequence.

It will be understood that any number of remote stations could be coupled to the PBX 253 depending on the grade of service required. It will also be understood that alternate types of trunk level interfaces such as ground start or loop start could also be used with remote station 250.

Figure 9A:
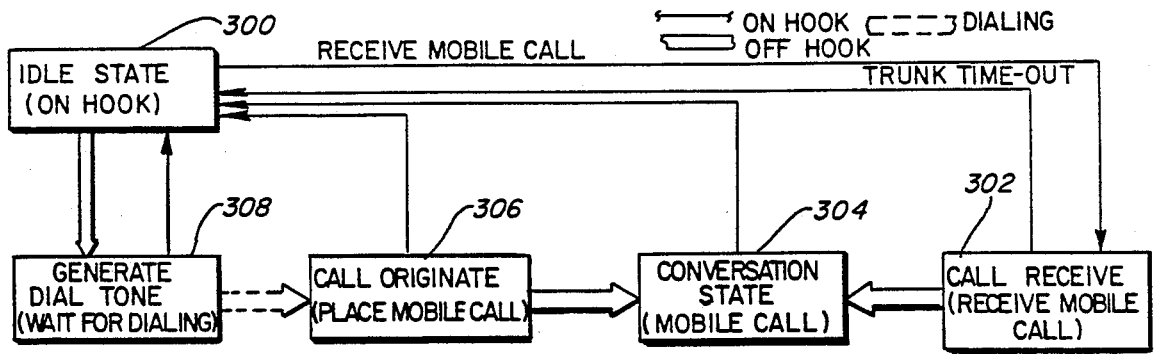
FIGS. 9A-9F are flow diagrams illustrating operation of the remote station of FIG. 8.

FIGS. 9A-9G together represent a series of flow diagrams illustrating the operational sequence of the software and hardware of the remote station 250. Flow diagram of FIG. 9A illustrates a variety of states that the processor 32 of the remote unit 250 can enter. In an idle state 300 the processor 32 awaits either incoming communications to be received via transceiver 232 or outgoing communications to be received from the PBX 252. In the event that an incoming valid identification number is detected by the transceiver 272, processor 32 switches from idle to state 300 to call receive state 302. Upon activation of the appropriate communication unit coupled to the PBX 252, the processor 32 switches from the call receive state 302 to the conversation state 304. In the event that the processor 32 detects that a communication unit coupled to the PBX 252 requires service to generate an outgoing communication, the processor 32 switches from the idle state 300 to the communication originating state 306.

Figure 9B:
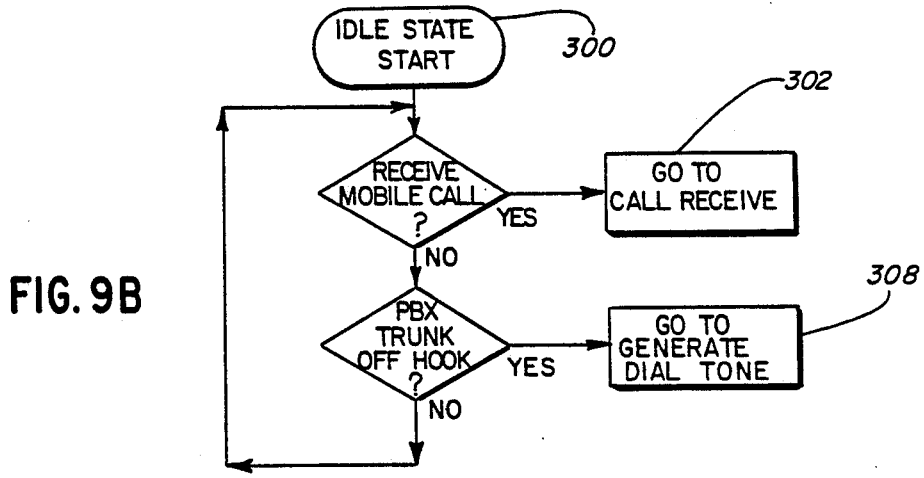
Figure 9C:
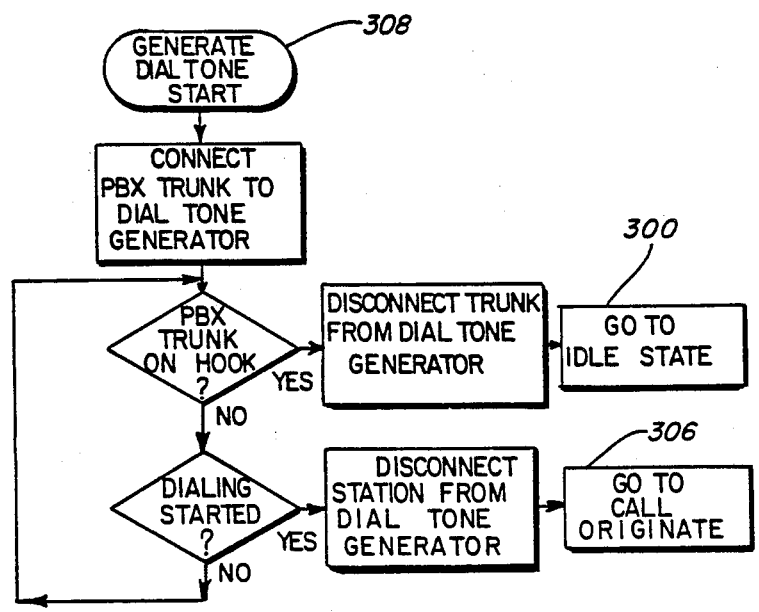
Figure 9D:
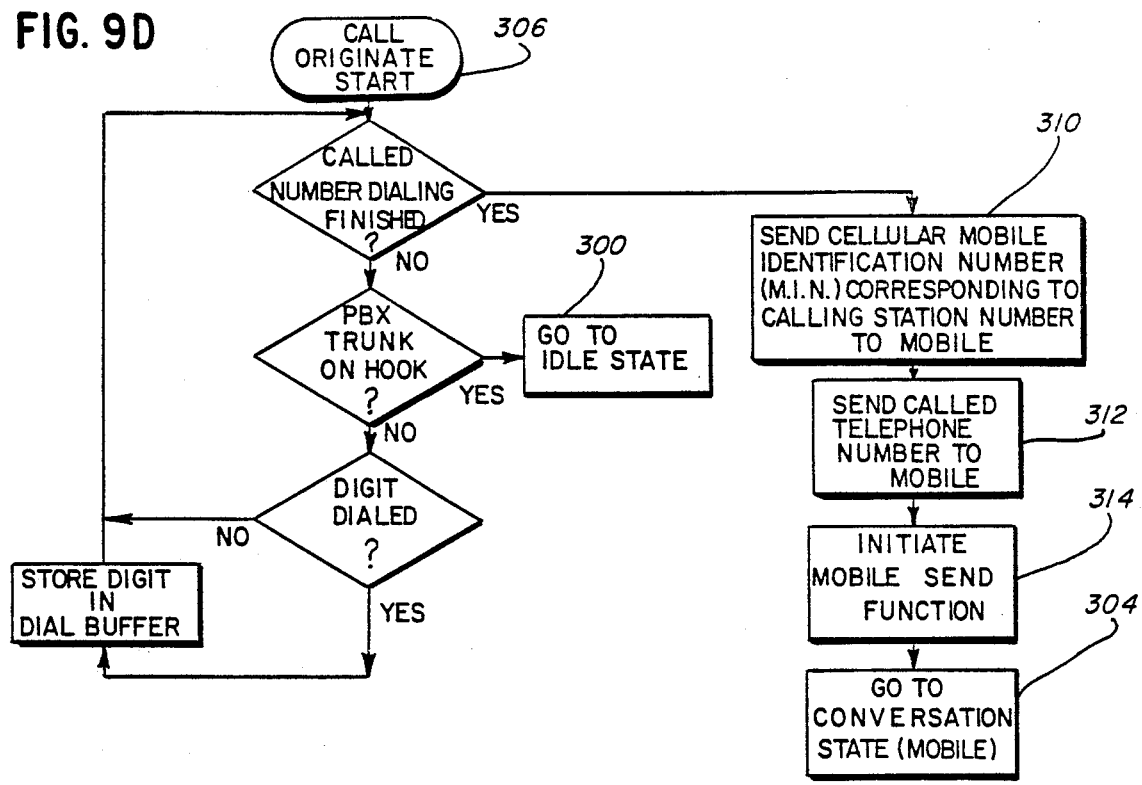

The flow diagram of FIG. 9B illustrates the steps of the idle state 300 while the processor 32 awaits either an incoming identification number or a outgoing communication. The flow diagram of FIG. 9C illustrates the steps of the dial tone state 308. The flow diagram of FIG. 9D illustrates the steps of the call originate state 306.

Figure 9E:
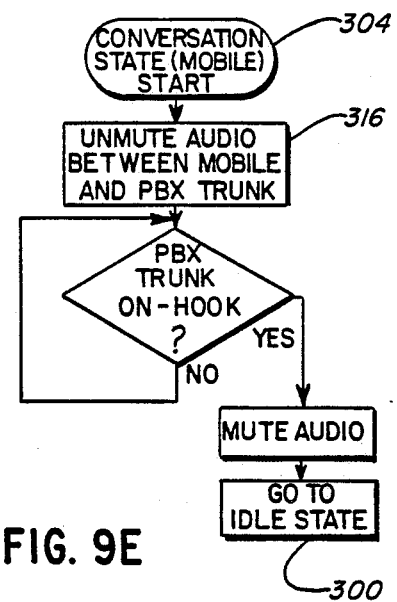

Upon detecting that the identification number generated at the local unit and transmitted via the PBX 252 to the remote station 250 is complete, the processor 32 transmits the appropriate communication originating identification number to the transceiver 272 for transmission. In a subsequent step 312 the processor 32 transmits the outgoing identification number to the transceiver 272 for transmission. The processor 32 initiates the send function of the transceiver 272 and then enters the conversation state 304. The flow diagram of FIG. 9E illustrates the steps of the conversation state 304 including establishing an audio communication link in a step 314 between the PBX 252 and the transceiver 272. Subsequent to the PBX trunk line signaling that the corresponding communication unit has become inactive, or gone on hook, the processor 32 switches back to the idle state 300.

Figure 9F:
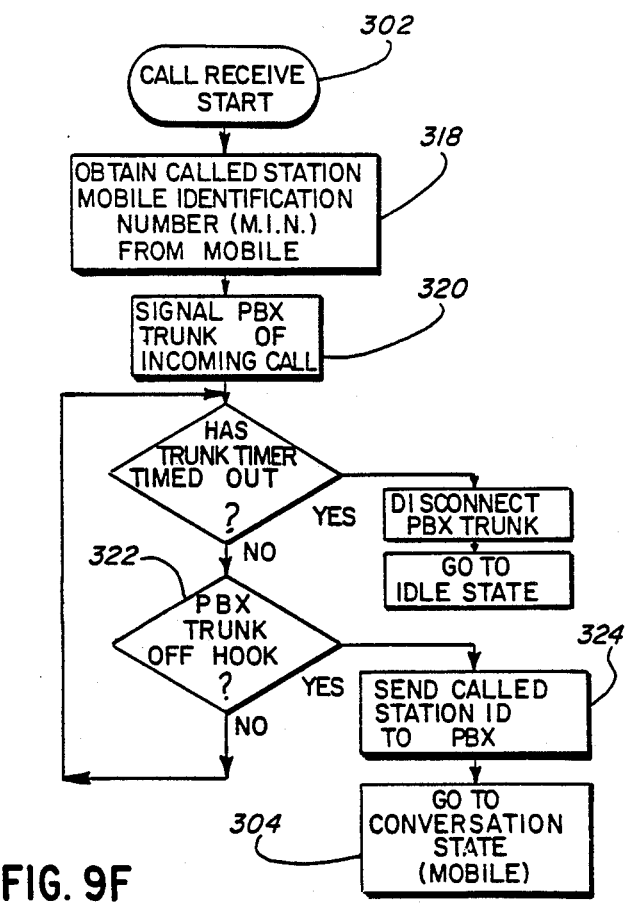

The flow diagram of FIG. 9F illustrates the steps of the call receive state 302. Upon receipt of a valid received identification number in the transceiver 272, that identification number is transmitted by the transceiver 72 to the processor 32 in a step 318. In a subsequent step, 320 the processor 32 via the audio unit 254 signals the PBX 252 that an incoming communication has arrived. After signaling the PBX 252 if that unit responds to the signal from the processor 32 in a step 322, the received identification number is transmitted through the PBX in a step 324 and the processor switches to the conversation 304. The PBX via its internal switching then couples the selected communication unit to the remote station 250.

Figure 10A:
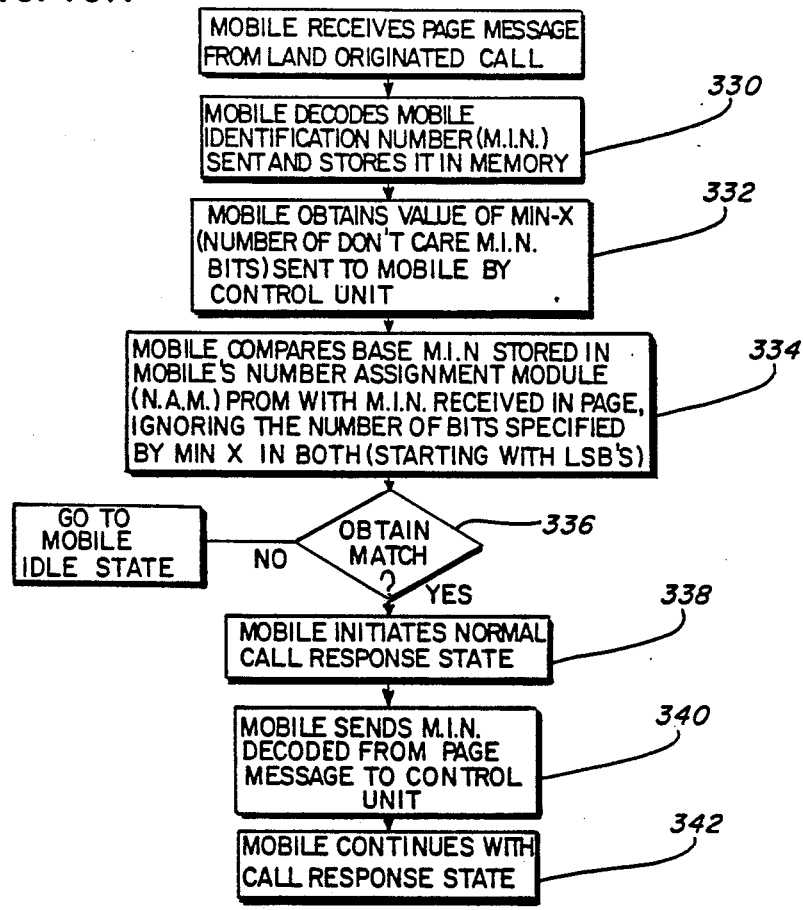
FIGS. 10A and 10B are flow diagrams illustrating in part the functioning of the transceivers of FIGS. 3 and 8.
Figure 10B:
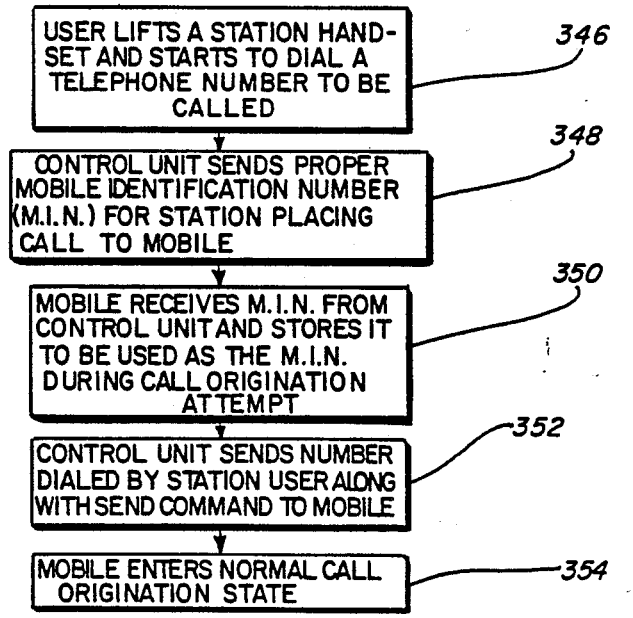

FIGS. 10A and 10B are flow diagrams disclosing steps of the operation of transceivers 62 or 272, in extension to normal cellular operation, in response to either receiving via the antenna 20 an identification number or receiving from the processor 32, an identification number. With respect to FIG. 10A if the transceiver receives a page from the remote cellular base station it decodes the received identification number and stores it in its internal memory in a step 330. In a step 332 the transceiver obtains the value or the number of the don't care identification number bits which had previously been provided by the processor 32. In a step 334, the transceiver compares the base portion of the identification number stored in its assignment module with the identification number received in the incoming page. In this comparison, the number of don't care bits which were previously specified by the processor 32 are ignored. If a match is detected on the portion of the received identification number which is compared with the base portion of the identification number in the step 334, the transceiver, in a step 338, enters its normal message processing state. In a subsequent step 340 the received and detected identification number is transmitted to the processor 32. The transceiver then returns to its normal incoming communication response state in a step 342.

In the flow diagram of FIG. 10B, the sequence of steps which the transceiver 62 or 272 executes in response the processor 32 directing it to carryout a transmission is illustrated. In an initial step, a communication unit becomes active. In the case where the communication unit is a telephone, activation occurs when the hand set is lifted and the unit goes off-hook. In a step 348, the processor 32 transmits the identification number of the active unit to the transceiver 62 or 272. In a step 350 the transceiver receives the identification number from the processor 32 and stores it. The processor then in a step 352 transmits to the transceiver the identification number of the receiving unit at the land line telephone system. In a step 354 the transceiver enters its call origination state and transmits both the communication originating identification number and the communication receiving identification number.

In contradistinction to the above, standard cellular transceivers are programmed to respond to only one predetermined identification number. Similarly, standard cellular transceivers are programmed to transmit only that same one identification number to identify a single calling unit.

The transceivers 62 or 272 are capable of responding to one of several identification numbers, in cellular terminology known as MIN's (Mobile Identification Number). This response is consistent with EIA Standard 3-B entitled CELLULAR SYSTEM MOBILE STATION - LAND STATION COMPATIBILITY SPECIFICATION. Paragraph 2.3.1 MOBILE IDENTIFICATION NUMBER defines a procedure for deriving the identification number. The transceiver is still identified by one and only one MIN, permanently stored in it's non volatile memory, and loaded into RAM during program execution. When a page message is received by the transceiver, such as 62 or 272, it looks for a match between the received MIN and its stored MIN. If all the bits match the transceiver signals the processor 32. For the remote stations 60 and 250, a group of least significant bits can be ignored in the match between MIN's, hence allowing the transceiver 62 or 272 to respond to several incoming identification numbers. When a match of the two MIN's has been decoded, the transceiver must send out the received MIN on its communication link to the control unit 64 or 252 to allow further processing of the incoming communication.

A new parameter called MIN_X, number of don't care MIN bits, is used to specify the number of least significant bits which should be ignored when matching a page message with the transceiver MIN. MIN_X can be in the range from 0 to 14 inclusive. A MIN_X=0 therefore obviously forces the transceiver 62 or 272 only to respond to its original MIN, while a MIN_X=14 will allow the transceiver to respond to any number within a given CO exchange, i.e. 239-XXXX. A MIN_X=4 will give a set of 16 numbers which the transceiver will respond to. These 16 numbers are not consecutive.

When the transceiver has matched a page message with a number in its expanded set of MIN's it shall use the MIN that was just received in its response. It shall send a lead-in character, followed by the received MIN, followed by a end-of-MIN character over the serial link to the processor 32. The lead-in character could be the "(" character, 28 hex, and the end-of-MIN character could be the ")" character, 29 hex. The MIN could be sent as ASCII character representing the hex digits of the received MIN and all 6 ASCII characters could be sent each time. This string of characters could be sent after the INUSE annunciator is first turned on and before the first "--CALL--" message is sent.

For reprogramming of the transceiver's MIN to be used in a local station originated call to identify the local station, the transceiver can accept a string of 6 ASCII characters representing the new MIN. This number could be followed by the "%" character, 25 hex, commanding the transceiver to convert and store the previous 6 ASCII characters in RAM and MIN. This new MIN would always be within the set of MIN's that the transceiver would normally respond to, given the original MIN and a group of don't care bits, so there will not be a conflict between changing MIN and decoding page messages. This local station identifying MIN would be transmitted to the base station along with an identifier, generated at or by the local station identifying the station, coupled to the remote land line system, to which the communication is directed.

As an alternate, the transceiver could maintain a table of predetermined MINs in its internal, non-volatile memory. The received identifier could be compared to the contents of that table. A match will indicate that the received identifier is one of the set of predetermined acceptable identifiers.

As yet another alternate, the transceiver, could execute a test sequence to determine if the received identifier exhibited a set of predetermined parameters. A match would again indicate that the received identifier is one of the set of predetermined acceptable identifiers.

The addendum attached hereto is a listing of the control program described in connection with the flow diagrams of FIG. 5.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

We claim:

1. A remote station for use in a cellular radio telephone system connectable to one or more units local to that station, the station comprising:
   a cellular transceiver including means for detecting and responding to two or more predetermined, different identification numbers received at the transceiver from the radio telephone system;
   programmable means, coupled to said transceiver for receiving an indicia of a detected, predetermined identification number therefrom and for storing each said indicia; and
   means for signaling at least a selected one of the connected local units corresponding to said stored indicia and for providing a bidirectional audio communication path between said transceiver and the corresponding local unit.

2. A remote station as in claim 1 with said storing means including programmable control means for sensing that said transceiver has detected one of the predetermined identification numbers prior to storing same.

3. A remote station as in claim 1 with said signaling means including means for switching and coupling said bidirectional audio path to a local unit corresponding to at least part of the detected predetermined identification number.

4. A remote station as in claim 3 wherein the local unit corresponds to a telephone.

5. A remote station as in claim 3 wherein the local unit is a private branch exchange with said signaling means including means for transferring at least part of the detected predetermined identification number to the private branch exchange.

6. A remote station as in claim 3 including means for emulating a trunk level interface.

7. A remote station as in claim 3 including means for sensing DTMF signals generated by a local unit.

8. A remote station for use in a cellular telephone system connectable to more than one unit local to that station, the station comprising:
- a cellular transceiver including means for detecting and responding to more than one predetermined identification number received at the transceiver from the cellular telephone system; and
- programmable control means for receiving at least an indicia of said predetermined detected number and for signaling a corresponding one of the connected local units in response thereto and for providing a bidirectional audio communication path between said transceiver and the corresponding local unit.

9. A remote station as in claim 8 with said programmable control means including a programmable control unit coupled to random access storage means.

10. A remote station as in claim 8 with said programmable control means including switching means for establishing a bidirectional audio communication link between said transceiver and the selected local unit.

11. A remote station as in claim 8 with said programmable control means including cross-point switching means for establishing a bidirectional audio communication link between said transceiver and the selected local unit.

12. A remote station as in claim 9 including a communication processing binary sequence encoded in read-only memory means coupled to said programmable control unit.

13. A method of processing information received from a cellular base station at a cellular transceiver of a cellular remote station with a plurality of communication units coupled thereto, the method comprising:
- sensing in the transceiver a received unit identifying indicium;
- comparing in the transceiver at least a portion of the received indicium to a corresponding prestored portion of a preselected multiple unit defining representation and generating a signal indicating a correspondence; and
- coupling the unit corresponding to the received identifying indicium to the transceiver in response to the generated signal.

14. A method as in claim 13 including generating a service requesting unit identifying indicium;
- transferring the service requesting unit identifying indicium to the transceiver; and
- transmitting that unit identifying indicium to the base station.

15. A remote station for use in a radio communication system connectable to at least one unit, the station comprising:
- a transceiver including means for detecting and responding to a plurality of predetermined, different identifiers received at the transceiver from the radio communication system; and
- means, coupled to said transceiver, for receiving from said transceiver a unique indicium for each said detected and received identifier and including trunk level emulating means couplable to the unit.

16. A remote station as in claim 15 including means for providing a bidirectional audio communication path between said transceiver and the unit.

17. A remote station as in claim 16 including programmable control means for sensing that said transceiver has detected one of the predetermined identifiers prior to receiving said received indicia.

18. A remote station as in claim 15 wherein the unit is a private branch exchange.

19. A remote station as in claim 18 including means for transferring an identifier for a service requesting communication unit, coupled to the private branch exchange, to said transceiver.

20. A remote system as in claim 15 with the radio communication system a cellular telephone system and with said transceiver a cellular transceiver.

21. A remote station as in claim 15 including means for transferring at least part of a detected predetermined identifier to the unit.

22. A remote station usable in a cellular telephone system to provide a communication link between a selected communication unit, local to the remote station, and a remote base station coupled to a land line telephone system, the remote station comprising:
- a transceiver including means for detecting whether or not an identifier received from the base station corresponds to one of a plurality of predetermined identifiers and for generating a unique indicium corresponding to each received, detected, predetermined identifier;
- control means for receiving said unique indicium from said transceiver; and
- switching means for coupling a selected communication unit, corresponding to said indicium, to said transceiver in response to said control means receiving said indicium.

23. In a remote station usable in a cellular telephone system to provide a communication link between a selected communication unit, local to the remote station, and a remote base station coupled to a land line telephone system, a transceiver including means for detecting whether or not an identifier received from the base station corresponds to one of a plurality of predetermined identifiers and for generating a unique indicium corresponding to each received, detected, predetermined identifier.

* * * * *